(12) United States Patent
Barnard et al.

(10) Patent No.: US 9,093,674 B2
(45) Date of Patent: *Jul. 28, 2015

(54) FUEL CELL STACK FLOW HOOD AIR FLOW USING AN AIR DISTRIBUTION DEVICE

(75) Inventors: Paul Barnard, Crawley (GB); Neville Haidar, Crawley (GB); Matthew Harrington, Crawley (GB)

(73) Assignee: Ceres Intellectual Property Company Limited, Horsham, West Sussex (GB)

( * ) Notice: Subject to any disclaimer, the term of this patent is extended or adjusted under 35 U.S.C. 154(b) by 1136 days.

This patent is subject to a terminal disclaimer.

(21) Appl. No.: 13/059,518

(22) PCT Filed: Aug. 20, 2009

(86) PCT No.: PCT/GB2009/002059
§ 371 (c)(1),
(2), (4) Date: Jun. 14, 2011

(87) PCT Pub. No.: WO2010/020797
PCT Pub. Date: Feb. 25, 2010

(65) Prior Publication Data
US 2011/0300460 A1    Dec. 8, 2011

Related U.S. Application Data

(60) Provisional application No. 61/090,947, filed on Aug. 22, 2008.

(30) Foreign Application Priority Data

Aug. 21, 2008  (GB) .................................. 0815312.4
Aug. 26, 2008  (GB) .................................. 0815535.0

(51) Int. Cl.
*H01M 8/24*     (2006.01)
*H01M 8/04*     (2006.01)

(52) U.S. Cl.
CPC ...... *H01M 8/04014* (2013.01); *H01M 8/04089* (2013.01); *H01M 8/2425* (2013.01); *H01M 8/2475* (2013.01); *H01M 8/2485* (2013.01); *Y02E 60/50* (2013.01)

(58) Field of Classification Search
CPC ............ H01M 8/2485; H01M 8/2475; H01M 8/04089
USPC .............................. 29/730; 429/452, 457, 458
See application file for complete search history.

(56) References Cited

U.S. PATENT DOCUMENTS

| 5,902,692 A | 5/1999 | Batawi |
| 6,042,956 A | 3/2000 | Lenel |

(Continued)

FOREIGN PATENT DOCUMENTS

| EP | 0377151 | 7/1990 |
| EP | 0580918 | 2/1994 |

(Continued)

OTHER PUBLICATIONS

International Patent Application No. PCT/GB2009/002059: International Search Report dated Nov. 11, 2009, 13 pages.

*Primary Examiner* — Ula C. Ruddock
*Assistant Examiner* — Frank Chernow
(74) *Attorney, Agent, or Firm* — Baker & Hostetler LLP

(57) ABSTRACT

The present invention is concerned with improved fuel cell stack assemblies, and methods of operation of a fuel cell stack assembly, particularly with improved gas flow and thermal management.

17 Claims, 11 Drawing Sheets

(56) References Cited

U.S. PATENT DOCUMENTS

| | | |
|---|---|---|
| 6,670,069 B2 | 12/2003 | Allen |
| 6,794,075 B2 | 9/2004 | Steele et al. |
| 6,866,954 B2 | 3/2005 | Hayashi et al. |
| 6,942,942 B2 | 9/2005 | Haltiner, Jr. et al. |
| 7,041,406 B2 | 5/2006 | Schuler et al. |
| 7,226,682 B2 | 6/2007 | Tachtler et al. |
| 7,255,157 B2 | 8/2007 | Richardson |
| 7,279,246 B2 | 10/2007 | Kelly et al. |
| 7,588,849 B2 | 9/2009 | Haltiner, Jr. et al. |
| 7,700,210 B2 | 4/2010 | Sridhar et al. |
| 7,736,774 B2 | 6/2010 | Ogiwara et al. |
| 8,642,227 B2 * | 2/2014 | Harrington et al. ........... 429/458 |
| 2001/0009732 A1 | 7/2001 | Schuler |
| 2003/0235726 A1 | 12/2003 | Kelly et al. |
| 2003/0235733 A1 | 12/2003 | Haltiner, Jr. et al. |
| 2003/0235751 A1 | 12/2003 | Kelly et al. |
| 2004/0043267 A1 | 3/2004 | Schuler et al. |
| 2005/0014046 A1 | 1/2005 | Tachtler et al. |
| 2005/0074659 A1 | 4/2005 | Thomas et al. |
| 2005/0089731 A1 | 4/2005 | Ogiwara et al. |
| 2006/0204796 A1 | 9/2006 | Potnis |
| 2006/0257696 A1 | 11/2006 | Sridhar et al. |

FOREIGN PATENT DOCUMENTS

| | | |
|---|---|---|
| EP | 1120845 | 8/2001 |
| EP | 1394883 | 3/2004 |
| EP | 1411571 | 4/2004 |
| EP | 1460367 | 9/2004 |
| GB | 2447136 | 9/2008 |
| WO | WO 02/35628 | 5/2002 |
| WO | WO 03/075382 | 9/2003 |
| WO | WO 2004/089848 | 10/2004 |
| WO | WO 2005/078843 | 8/2005 |
| WO | WO 2006/079800 | 8/2006 |
| WO | WO 2006/106334 | 10/2006 |
| WO | WO 2007/085863 | 8/2007 |
| WO | WO 2007/110587 | 10/2007 |
| WO | WO 2008/001119 | 1/2008 |
| WO | WO 2008/003976 | 1/2008 |
| WO | WO 2008/015461 | 2/2008 |
| WO | WO 2008/053213 | 5/2008 |
| WO | WO 2008/104760 | 9/2008 |
| WO | WO 2010/020797 | 2/2010 |

* cited by examiner

FUEL CELL STACK FLOW HOOD AIR FLOW USING AN AIR DISTRIBUTION DEVICE

The present invention is concerned with improved fuel cell stack assemblies, and methods of operation of a fuel cell stack assembly, particularly with improved gas flow and thermal management.

The term "fuel cell stack assembly" as used herein means an at least one fuel cell stack, each at least one fuel cell stack comprising at least one fuel cell stack layer, each at least one fuel cell stack layer comprising at least one fuel cell, fuel and oxidant inlet/outlet connections, and flow paths for fuel and oxidant stream or streams, and for used fuel and oxidant stream or streams, a fuel cell stack base plate and a hood sealingly attached to the fuel cell stack base plate and defining a hood volume between the fuel cell stack base plate and the hood, an at least one gas inlet into the hood volume, and a pre-heater (not located in the hood volume). Other optional components of a fuel cell stack assembly include a fuel side seal assembly, oxidant side seal assembly, end-plates and a compression system, fuel cell stack insulation, and electrical and control/monitoring connections as appropriate.

The term "fuel cell stack system assembly" as used herein means a fuel cell stack assembly together with system electronics and control means. Other optional components include a reformer (if inlet fuel is to be reformed or pre-reformed), a water recovery system, a steam generator unit, an at least one heat exchanger optionally involving the phase change of one of the heat exchanger streams, thermal insulation, a start-up burner, and a tail-gas combustor.

The term "system electronics" includes the control electronics and/or any power electronics, where there can be at least one electronics board and/or unit optionally placed together or apart, in or close to the fuel cell stack assembly.

The term "control means" includes the gas and fluid control valves and pumps, air (oxidant) blower unit, and safety equipment, together with input and sensing means as appropriate.

Fuel cell stack assemblies are operated taking inlet oxidant and fuel to generate oxidation products (herein referred to as exhaust gas streams, but also referred to as anode off-gas and cathode off-gas), heat, and electricity in the form of a DC current. Overall, fuel cell stack system assemblies can also comprise additional elements including system control means and system electronics including e.g. power electronics which transform the DC fuel cell output from a first voltage to a second voltage, and/or transform the DC fuel cell output into an AC wave form.

It is common to run fuel cell stacks with an oxidant to fuel ratio of between 1:1 and 20:1, more commonly 5:1 to 15:1 and more commonly 8:1 to 12:1. Thus in normal operation there is a stoichiometric excess of oxidant gas flowing through the fuel cell stack. The excess of oxidant gas flow is typically used to enable cooling of the fuel cell stack to occur close to the electrochemical reaction site of the fuel cell.

Where a reformer unit is used to reform or pre-reform the fuel, it is common to use a steam reforming catalyst to achieve an effective and efficient reformation process. When using, for instance, methane based fuel, such as natural gas, it is not untypical to have a steam to carbon ratio of between 2:1 and 3:1. When using propane based fuel gas, such as LPG, it is not untypical to have a steam to carbon ratio of between 3:1 and 4:1, although this can be as high as 5:1 depending on the LPG constituent elements, such as the percentage of long chain hydrocarbons and double-bonds e.g. alkenes. When using butane based fuel gas, it is not untypical to have a steam to carbon ratio of between 4:1 and 5:1. For a given reformer design, increasing the steam to carbon ratio during reformer operation generally results in a decrease in the reformer exhaust temperature.

To those skilled in the art, it is well known that the operating efficiency of a fuel cell is related to the local temperature at the point of electrochemical reaction in the fuel cell. In the operation of a fuel cell stack assembly, an inlet gas stream is heated prior to its entering a fuel cell—if it enters the fuel cell at too low a temperature then the local temperature at the point of electrochemical reaction may be too low and the operational efficiency and power output of the fuel cell may be adversely affected. The ability to manage the temperature of a fuel cell stack has a significant effect upon the operating efficiency of the fuel cell stack and its rated power output. Substantial engineering effort is spent designing fuel cell stack and balance of plant components and control processes to ensure that the fuel cell stack maintains the correct temperature for the most effective electrochemical reaction over a range of operating conditions. Typical operating conditions include system start-up, steady state operation, dynamic load change, and system shut-down.

For example, with an intermediate-temperature solid oxide fuel cell (IT-SOFC) device, the electrochemical reaction of the fuel cell(s) of a fuel cell stack in a fuel cell stack assembly may operate most efficiently with a local fuel cell temperature between 450-650° C. The fuel cell stack operating temperature is typically between 450-650° C. For effective operation of the fuel cell stack it is desirable to heat the oxidant and fuel inlet streams to a temperature close to that of the operating temperature of the fuel cell stack, e.g. within 0-20%, more preferably within 0-10%, more preferably still 0-5%, of the fuel cell stack operational temperature in ° C. An example of such an IT-SOFC is a fuel cell stack incorporating at least one metal supported ceria gadolinium oxide (CGO) based electrolyte fuel cell. An example of such an IT-SOFC system may have at least one heat exchange system (pre-heater) capable of heating the oxidant gas stream entering into the fuel cell stack to a temperature of around 480° C. In some fuel cell system designs, the heat exchanger system exit oxidant gas stream temperature is designed to be substantially the same as the required fuel cell stack oxidant gas stream inlet temperature, such that no further heat exchange to the fuel cell inlet oxidant gas stream is required. In a typical IT-SOFC system, the heating gas for the heat exchange system may have a heat exchanger system inlet temperature of around 510° C. Due to the low thermal potential between the required temperature (about 480° C.) of the oxidant gas stream entering into the fuel cell stack and the heat exchange system heating gas inlet temperature of around 510° C., the heat exchanger design is necessarily large in size and of high mass. An example of such a heat exchange system for an approximate 1 kW electric power output fuel cell system is a highly efficient but complex and costly design heat exchange unit weighing about 3.5 kg The heat exchange system for heating the fuel cell stack oxidant gas stream may be made up of at least two heat exchanger units. The at least two heat exchange units may use at least two fuel cell system gas streams (e.g. an anode off-gas stream and a tail-gas burner off-gas stream) as a heating fluid for the fuel cell stack oxidant gas stream.

Various heat exchange arrangements to enable heating of fuel cell stack gas inlet streams are known from the prior art e.g. U.S. Pat. No. 5,902,692, U.S. Pat. No. 6,042,956 and EP 0580918. However, such devices are complex and costly and difficult to manufacture, and in particular encounter problems with effecting sealing to prevent gas stream mixing, and have limited heat exchange surface area.

U.S. 2005/0089731 describes a system having essential features of a solid oxide fuel cell stack combined with a pre-reformer and an integrated heat exchanger, where the integrated heat exchanger incorporates two heat exchangers and an SOFC stack off-gas combustor all enclosed in an adiabatic vessel.

The thermal energy released from the off-gas combustor is used as the heating source in the heat exchangers. The SOFC is described as being capable of operating at 750 Deg C., although an operating range of 650-850 Deg C. is stated. The fuel is pre-reformed to a temperature of 300 to 600 Deg C. (para [0063]). In most of the embodiments described, both the fuel and air are then heated in one or more heat exchangers by using the heat from the catalytic combustor in the integrated heat exchanger (para [0079]) or by using the combustor heat and the heat energy from the air or fuel exhausting from the fuel cell stack (para [0080]).

A situation exists in some fuel cells where the fuel gas, instead of being directly fed to the stack, is fed around the periphery of the stack to gain extra heat before entering the fuel cell stack itself. However, the specifics of this teaching are non-enabling. The fuel is fed directly from the pre-reformer at between 300 and 600 Deg C. (395 Deg C.-para [0125]) to the space around the fuel cell stack before the fuel enters into the fuel cell stack. The fuel cell stack requires fuel at a temperature of 650-850 Deg C., most likely around 750 Deg C. There is no description of how the fuel achieves sufficient heat energy between leaving the pre-reformer and entering the fuel cell stack. In order for a temperature rise of greater than 100 Deg C. to happen, the fuel would have to dwell in the stack area void for sufficient time to gain sufficient thermal energy, and there is no suggestion or teaching of how this is achieved. Additionally, there is no explanation of how the void around the stack is structured and how the void is made gas tight to stop the gases escaping from the thermal insulation that makes up the adiabatic vessel. This is not a trivial matter as the high temperatures and the presence of explosive gases containing hydrogen makes for significant engineering challenges to ensure complete gas tightness over a wide temperature operating range—something that might not even be possible with gases over 650 Deg C. in the void between the stack periphery and the adiabatic vessel thermal insulation.

In para [0105] it is stated that instead of heating the fuel on the periphery of the fuel cell stack, the air can be heated on the periphery of the fuel cell stack. It is taught that air is fed from the air blower directly to the periphery of the fuel cell stack. Again, this is non-nabling. Firstly, the air would enter the void around the periphery at close to ambient temperature and would need its temperature increasing by at least 600 Deg C. There is no suggestion or disclosure of how that is to be achieved, and if it is not achieved then the fuel cell stack will simply stop operating. The thermal shock introduced onto the surface of the fuel cell stack by introducing air of such a temperature difference would introduce severe local stresses which could lead to stack failure and/or loss of stack performance either through rapid local cooling of the active fuel cell components in that area and/or loss of gas seal integrity or ceramic material integrity.

Thus U.S. 2005/0089731 is of relevance but is fundamentally flawed in its disclosure.

Other prior art includes EP 0377151 , U.S. Pat. Nos. 6,670,069, 6,866,954 , U.S. 2001/0009732 (EP 1120845), U.S. 2003/0235751 , U.S. 2004/0043267 , U.S. 2005/0014046 , U.S. 2005/0074659 , U.S. 2006/0204796 , U.S. 2006/0257696 , U.S. Pat. No. 6,942,942 (EP1411571), U.S.2003/0235733 (EP1394883), U.S. Pat. No. 7,255,157 (EP1460367) and WO2008/104760 (GB2447136).

Furthermore, it has been found that a fuel cell stack having multiple layers of fuel cells has a temperature gradient not only along the electrochemically reactive line of a fuel cell, but also across the stack height (defined from the fuel cell stack layer closest to the base plate to the fuel cell stack layer furthest from the base plate). It is desirable to minimise the variance in temperature across the stack height so that each fuel cell operates in generally the same way.

The majority of stack cooling is achieved by either using the oxidant stream (typically an air stream) to remove thermal energy from the electrochemically active areas of the fuel cell, or by additionally using the endothermic internal reforming reaction to remove heat from the electrochemically active area of the fuel cell.

For a fuel cell stack design, it is expected that the fuel cell stack fuel cell layer temperatures will be slightly lower at the top and bottom ends of the stack (compared to the centre of the stack) because the fuel cell stack end-plates adjacent to the fuel cell stack ends are not generally heat generative, and thus act as a thermal sink, taking heat away from the adjacent fuel cell stack fuel cell layers. Whilst effective stack design and surrounding system design can reduce the thermal sink effect, there is still a noticeable effect during fuel cell stack operation. For a fuel cell stack with an open manifolded oxidant inlet design, it is found that the oxidant inlet temperatures to the end layers of the fuel cell stack are higher than those at the middle, and this is primarily found to be as a result of additional heat being picked up from the fuel cell stack base plate/end plate.

For a given fuel cell design, there is a defined operating temperature range where the cell produces optimal voltage and current outputs. Operating outside this temperature range results in non-optimal cell performance. The temperature difference across the stack is only important when the difference in operating temperature between one fuel cell and another fuel cell produces a difference in cell operating performance for those affected cells. This difference in cell operating performance can manifest itself as a reduction in fuel cell stack electrical power output as a result of temperature variation across the fuel cell stack. Thus, it is desirable to control the temperature difference across the stack in order that all the fuel cell stack fuel cells to operate in the optimal temperature range and hence optimise the fuel cell stack electrical power output.

One way to achieve this is to control the oxidant inlet and the fuel inlet temperatures to each fuel cell in the stack. However, in practice cost effective stack design for volume manufacture results in a common oxidant and fuel feed to a large number of cells in a fuel cell stack—it is impractical to provide a discrete oxidant inlet to each fuel cell. An example of an oxidant inlet arrangement for a fuel cell stack is a common fluid feed manifold in an internally manifolded fuel cell stack design. In-use, such a manifold will have different temperatures along its length due to the thermal end effects of the stack. If the manifold temperature difference results in fluid entry temperature into the fuel cells being such that the operating temperature of certain cells is outside that of the effective operating range, then the overall stack operating efficiency and electrical power output can be affected.

An alternative method is to tailor the fuel cell designs differently for each of the various stack operating temperatures. This approach is undesirable where a high volume low cost approach is taken for fuel cell manufacture and for fuel cell stack assembly manufacture, where a single design of fuel cell is preferably used throughout the whole fuel cell stack.

Another approach is to use multiple oxidant feeds into the fuel cell stack, with different feeds being designed to feed oxidant at different temperatures. This is undesirable since it increases the complexity of fuel cell stack and fuel cell stack assembly manufacture, as well as resulting in additional complexity in fuel cell stack operation control.

The present invention seeks to overcome the prior art disadvantages.

According to the present invention there is provided an intermediate-temperature solid oxide fuel cell stack assembly comprising:
  (i) a base plate;
  (ii) a hood sealingly attached to said base plate and defining a hood volume between said base plate and said hood;
  (iii) at least one intermediate-temperature solid oxide fuel cell stack mounted upon said base plate and enclosed by said hood;
  (iv) at least one gas inlet defining an at least one gas inlet point into said hood volume; and
  (v) a pre-heater located external to said hood volume and in fluid communication with an oxidant source and said at least one gas inlet and adapted to supply oxidant from said oxidant source to said hood volume via said gas inlet, each fuel cell stack comprising at least three fuel cell stack layers, each fuel cell stack layer comprising at least one intermediate-temperature solid oxide fuel cell, each fuel cell defining an oxidant inlet end and an exhaust oxidant outlet end, said at least one fuel cell stack having:
  (a) at least one open-manifolded gas inlet defining an open-manifold end of said at least one fuel cell stack; and
  (b) at least one internally manifolded gas outlet, said at least one gas inlet point into said hood volume located remote from said open-manifold end of said at least one fuel cell stack such that in-use oxidant enters said hood volume through said at least one gas inlet and passes around the outside of said at least one fuel cell stack to said at least one open-manifolded gas inlet, direct heat transfer occurring between said oxidant and the external surface of said fuel cell stack layers prior to entry of said oxidant into said open-manifolded gas inlet, said pre-heater being configured such that in-use oxidant from said oxidant source is heated and supplied to said hood volume via said at least one gas inlet at a temperature not more than 100° C. below the in-use operating temperature at the inlet end of the fuel cell nearest the at least one open-manifolded gas inlet, wherein said at least one intermediate temperature solid oxide fuel cell stack defines a height X measured from the fuel cell stack layer closest to said base plate to the fuel cell stack layer furthest from said base plate, and wherein said at least one gas inlet point is located at a height Y above said fuel cell stack layer closest to said base plate, wherein $0.25X \leq Y \leq 0.75X$.

Preferably, the at least one fuel cell stack comprises at least 5, 10, 15, 20, 25, 30, 35, 40, 45, 50, 55, 60, 65, 70, 75 or 80 fuel cell stack layers.

The at least one gas inlet point is the point at which in-use oxidant gas enters the hood volume such that it is able to mix with existing oxidant contained within the hood volume and is able to pass around the outside of the at least one fuel cell stack to the at least one open-manifolded gas inlet.

Preferably, the fuel cell stack assembly does not comprise any additional gas inlet point into the hood volume located at a height Y above said fuel cell stack layer closest to said base plate wherein $Y<0.25X$ or $Y>0.75X$ and configured to in-use allow oxidant to enter the hood volume at the same or substantially the same temperature as oxidant entering the hood volume from the at least one gas inlet point located at a height Y where $0.25X \leq Y \leq 0.75X$. Experiments have shown that where gas inlet points are provided at vertical heights where $Y<0.25X$ or $Y>0.75X$ the improved temperature profiles observed by the present invention are not achieved.

It has been found that in an intermediate-temperature solid oxide fuel cell (IT-SOFC) fuel cell stack assembly operating in the 450-650° C. range, the difference between oxidant temperature at open-manifolded gas inlets where (i) X=0 and X=1 (fuel cell stack layers closest to and furthest from the base plate) and (ii) X=0.5 (middle layers of the fuel cell stack assembly) can vary by up to 40° C. This is clearly undesirable.

As is detailed below and shown in the FIG. 10, the provision of the at least one gas inlet point at the required vertical position significantly reduces the variance in temperature at the at least one open-manifolded gas inlet. This is particularly evident at fuel cell stack layers closest to and furthest from the base plate where deviation from the ideal inlet temperature is significantly reduced and in some embodiments is more than halved.

This reduction in oxidant temperature variance at the at least one open-manifolded gas inlet allows for significant improvements in fuel cell stack performance in terms of operational efficiency and electrical power output, and can also help extend operational life by reducing the temperature difference between adjacent fuel cells and across a fuel call stack and thus reduce the mechanical stresses on individual fuel cells.

Both modeling results and experimental data with varying Y values confirm that the temperature profile improvements are real when $0.25X \leq Y \leq 0.75X$, and that this resulted in a noticeable improvement in the fuel cell stack assembly performance, particularly when Y is about 0.5X, when the difference in oxidant temperature at open-manifolded gas inlets at (i) and (ii) (above) can be reduced to less than 10° C.

Thus, preferably, $0.3X \leq Y \leq 0.7X$. More preferably, $0.35X \leq Y \leq 0.65X$. More preferably, $0.4X \leq Y \leq 0.6X$. More preferably, $0.45X \leq Y \leq 0.55X$. More preferably still, Y is about 0.5X.

Preferably, the pre-heater is a passive heat-exchanger device. More preferably, the pre-heater is designed such that the fluid giving up thermal energy across the heat exchanger is the exhaust stream from the fuel cell stack assembly or a component part thereof, for example from a reformer exhaust stream in embodiments including a reformer, or from a tail gas burner, and the fluid gaining thermal energy across the heat exchanger is the oxidant gas.

The present invention seeks to achieve a number of significant advantages by in-use providing the oxidant to the hood volume in the specified temperature range and achieving heating in the hood volume. Firstly, it seeks to allow a significant reduction in size and mass of the pre-heater component used to heat oxidant prior to its entry into the fuel cell stack, in turn reducing the size and cost of the final product. By providing the oxidant into the hood volume remote to the open-manifold end of the at least one fuel cell stack and allowing the oxidant to cool the surface of the at least one fuel cell stack and in turn heat the oxidant, the present invention seeks to cause a significant reduction in the temperature gradient across the at least one fuel cell stack, in turn increasing its efficiency and reducing mechanical stress and increasing longevity. This is neither suggested nor disclosed by the prior art.

In contrast to the example given above for a heat exchanger system required for an approximately 1 kW electric power output fuel cell system, if the required temperature of the fuel cell stack oxidant gas stream exiting the heat exchanger system is reduced from about 480° C. to about 455° C., the increase in the thermal potential between the heat exchange fluids means that the necessary efficiency of the heat exchanger system may be substantially reduced and the complexity, cost and mass reduced accordingly. In the 1 kW electric power output fuel cell system example given above, the mass can be reduced to about 2.5 kg, an almost 30% reduction. Similarly, the physical dimensions of such a heat exchanger system can also be substantially reduced, another highly desirable feature in any fuel cell stack system assembly where space and weight is frequently at a premium.

In use, a fuel cell stack comprising at least one fuel cell generates heat, electricity and water by the electrochemical activity that occurs in the fuel cell(s). Due to the internal electrical resistance of the fuel cell stack components, there is additional heat generated as the electrical current flows through the fuel cell stack components. This means that the temperature of the fuel cell and surrounding fuel cell components increases along the gas flow path from inlet(s) to outlet(s). Thus it is often observed that the temperature at the inlet end of the fuel cell stack gas (fluid) flow path is cooler than that at the gas (fluid) outlet end. This temperature difference generates a thermal gradient along the gas flow path and results in the fuel cell stack and its components having different temperatures between the gas flow inlet and outlet ends. Thus, the external surface of the fuel cell stack can have different temperatures at its gas flow path inlet end (e.g. an open-manifold inlet end) and its outlet end (e.g. an internally manifolded outlet end).

It is desirable to minimise thermal gradients within a fuel cell stack in order to enable and optimise efficient fuel cell stack operation. Reducing the thermal gradients in the fuel cell stack, and thus in the fuel cell stack layers, reduces the thermally induced mechanical stresses on the fuel cell stack components. Thus, minimising the temperature gradient across a fuel cell electrochemical active area is not only beneficial to the effectiveness and efficiency of fuel cell operation, but can also reduce system complexity, reduce overall system cost, and can result in a more reliable system.

Preferably, the fuel cell stack assembly does not comprise an inlet gas pre-heater or heat exchange system located within said hood volume. In particular, it is preferred that the hood and/or base plate does not comprise a heat exchange surface of a heat exchanger having an in-use cool side on the interior of the hood volume and an in-use hot side external to the hood volume and in thermal communication with a fuel cell stack assembly fluid outlet, particularly a fuel cell stack oxidant-side outlet. Most preferably, such an inlet gas pre-heater located within said hood volume is not an oxidant pre-heater.

Preferably, the pre-heater is configured such that in-use oxidant from said oxidant source is heated and supplied to said hood volume via said at least one gas inlet at a temperature not greater than 80° C., more preferably not greater than 70° C., more preferably not greater than 60° C., more preferably not greater than 50° C. below the in-use operating temperature at the inlet end of the fuel cell nearest the at least one open-manifolded gas inlet.

As will be appreciated, with the fuel cell stack assembly operating in different modes (e.g. start-up, steady state operation etc.) it is possible that the pre-heater will supply oxidant to the hood volume at a temperature greater than the in-use operating temperature at the inlet end of the fuel cell nearest the at least one open-manifolded gas inlet.

Preferably, said at least one fuel cell stack additionally comprises at least one internally manifolded fuel inlet.

Preferably, said fuel cell stack additionally comprising at least one internally manifolded exhaust fuel outlet.

In certain embodiments, the at least one internally manifolded gas outlet comprises at least one internally manifolded mixed exhaust fuel and oxidant outlet.

By "direct heat transfer" is meant that the oxidant directly contacts an external surface of the at least one fuel cell stack. In particular, this external surface can include the sides of the fuel cell stack layers. The external surface can also include the sides of additional fuel cell stack components such as interconnect plates, stack layer gaskets or non-conductive spacers.

Thus, direct heat transfer is effected from the exterior of the at least one fuel cell stack to the oxidant passing over it, and this can achieve the final required heating of the oxidant prior to its entry into the at least one fuel cell stack.

The at least one gas inlet point into the hood volume is located remote from the open-manifold end of the at least one fuel cell stack. Preferably the at least one gas inlet point into the hood volume is located at an opposite end of the at least one fuel cell stack to the open-manifold end. Where there is more than one open manifold into the at least one fuel cell stack, the at least one gas inlet point into the hood volume may be located remote and generally equidistant from the open manifolds.

In certain embodiments, the at least one gas inlet comprises a single gas inlet. In alternative embodiments, the at least one gas inlet comprises a plurality of gas inlets.

In certain embodiments, the at least one gas inlet is located in the base plate. In alternative embodiments, the at least one gas inlet is located in the hood. In alternative embodiments, gas inlets are located in both the hood and the base plate. For the various embodiments, locations and numbers of gas inlets and gas inlet points, the fuel cell stack assembly preferably additionally comprises at least one baffle, feature or component located in fluid communication with the at least one gas inlet, to encourage a desired fluid distribution of gas entering the hood volume from the gas inlet. In particular, in embodiments where the at least one gas inlet is located in the base plate, a manifold or component may be provided to aid in-use distribution of the inlet gas flow over the whole of the hot surface of the fuel cell stack assembly, thus helping avoid any stagnant fluid flow regions in the hood volume, and also helping avoid excessive unwanted channeling of gas flow. The distribution of the inlet gas flow can be so designed to account for uneven surface temperatures of the fuel cell stack.

The hood is placed so as to enclose the at least one fuel cell stack with clearance space between the at least one fuel cell stack and the inside surface of the hood.

Preferred embodiments are shown below, and by having the gas inlet into the hood volume located remote from the open manifold end of the at least one fuel cell stack, in-use inlet gas is caused to flow around the external surface of the at least one fuel cell stack prior to reaching the open manifold end at which it can enter the at least one open-manifolded gas inlet and pass to the at least one fuel cell.

This arrangement allows for heat exchange between the at least one fuel cell stack and the inlet gas over an enlarged surface area when compared to prior art devices and thus allows the final desired temperature increase by way of a simple and convenient fuel cell stack assembly design.

In addition, since the at least one gas inlet point into the hood volume is located remote from the at least one open manifold end of the at least one fuel cell stack, it will typically be located adjacent the at least one gas outlet end of the at least one fuel cell stack, which, in operation is typically the highest temperature region of the at least one fuel cell stack. The thermal potential between the oxidant entering via the gas inlet point into the hood volume and the adjacent part of the at least one fuel cell stack will therefore be high and the rate of heat exchange will be high, meaning that heat exchange will take place at a relatively high rate. As the gas in the hood volume is heated and flows towards the cooler open manifold end of the at least one fuel cell stack, the thermal potential between the oxidant and the adjacent part of the at least one fuel cell stack will be lower and so the rate of heat exchange will be lower and less heat exchange will take place. Overall, this means that less heat exchange will occur at the cooler open manifold end of the at least one fuel cell stack and that more will occur at the hotter remote end, meaning that the temperature gradient across the fuel cell stack may be reduced.

Preferably, the at least one fuel cell stack and hood are arranged such that in-use oxidant flow from the gas inlet to the hood volume to the open-manifold end of the at least one fuel cell stack primarily occurs around the sides of the at least one fuel cell stack and not over the top of the at least one fuel cell stack.

For example, the at least one fuel cell stack and the hood can be dimensioned such that a narrow gap is defined between the top of the at least one fuel cell stack and the hood such that in-use it restricts oxidant flow across the top of the at least one fuel cell stack. Alternatively, a wall can be provided around the perimeter of the top of the at least one fuel cell stack so as to seal between it and the hood and block oxidant flow. Preferably, such a wall is thermally insulated to reduce or minimise heat transfer from the at least one fuel cell stack to the hood. Alternatively, a thermally insulating block may be provided on top of the at least one fuel cell stack between it and the hood so as to reduce or prevent oxidant flow across the top of the at least one fuel cell stack. Preferably such a thermally insulating block contacts the hood so as to effect a seal between the at least one fuel cell stack and the hood and prevent oxidant flow over the top of the fuel cell stack. Alternatively the hood may contact the top of the fuel cell stack so to effect a seal between the at least one fuel cell stack and the hood and prevent oxidant flow over the top of the fuel cell stack.

The at least one fuel cell stack preferably comprises an end-plate located at its top, and such an end-plate can be shaped and dimensioned to control oxidant flow over the top of the at least one fuel cell stack, for example by the provision of arms, fingers, walls or bodies which affect in-use fluid flow.

This can be particularly advantageous in reducing the thermal gradient between the centre and the ends of the fuel cell stack. A fuel cell stack consisting of a number of fuel cell stack layers, and thus a number of fuel cells, will operate at increased efficiency if the temperature gradient between cells along the stacked direction is minimised. To this end, reduction of heat loss from fuel cell stack end-plates at the top and bottom of the fuel cell stack has been proven to be a significant advantage. Thus minimisation of the flow of oxidant in the hood volume over the fuel cell stack end-plates will assist in this objective by reducing the amount of heat ejected from the end-plate to the hood volume oxidant. Flow over the top end-plate can be minimised by use of a physical barrier between the end-plate and the hood which can be of thermally insulating material.

In use, the fuel cell stack generates a substantial amount of heat that must be removed to enable efficient fuel cell electrochemical operation. The inlet gas entering at least one fuel cell stack performs the important role of effecting cooling within the stack. This is typically achieved by passing an excess volume of oxidant (for example having a molar volume of oxygen at least e.g. 2, 3, 4, 8, 10, 12, 15 or 20 times that necessary for oxidation of the fuel) across the fuel cell stack. However, this in turn requires the expenditure of energy on e.g. blowers to pass the oxidant through the fuel cell stack system assembly, and so any improvement in the total heat exchange from the at least one fuel cell stack to the inlet gas, particularly oxidant, can reduce the volume of gas required to effect the required heat exchange and in turn can reduce the power consumption of the fuel cell stack system assembly. The provision of the external surface of the at least one fuel cell stack as a heat exchange surface can be further advantageous in providing for an increased amount of heat exchange to each unit volume of inlet gas and thus reducing the amount of inlet gas required.

Sealingly connecting the base of the hood to the base plate is preferably achieved by welding, brazing or gluing. Preferably, the fuel cell stack assembly additionally comprises a thermally insulating material located between the base plate and the hood. Preferably, this takes the form of a gasket, and thus a gasket can be placed between the hood and the base plate and gasket compression means applied to produce the necessary seal. Such a gasket is preferably a thermally insulating and gas-tight gasket such as a vermiculite gasket or a viton gasket. Thus, the hood can be insulated from heat transfer from the at least one fuel cell stack via the base plate.

Preferably, the hood is provided with insulating material located on at least one of its internal and external surfaces. This acts to further insulate the hood from heat transfer from the at least one fuel cell stack and also acts to reduce heat transfer from the hood to other components external to it.

In order to further enhance gas flow within the hood volume, the gas inlet into the hood volume is preferably provided with at least one baffle.

Preferably (and as detailed below), the hood is provided with at least one baffle extending into the hood volume, the at least one baffle being shaped and dimensioned so as to control fluid flow within the hood volume. In particular, an at least one baffle can prevent fluid flow occurring over the top of the at least one fuel cell stack.

Alternatively, the hood can be provided with at least one additional surface feature such as a rib or finger to control the direction of fluid flow and/or to encourage fluid flow around the at least one fuel cell stack as opposed to over the top of the at least one fuel cell stack.

As noted above, the at least one fuel cell stack and the hood are preferably dimensioned to control fluid flow within the hood volume, preferably to encourage fluid flow to occur around the at least one fuel cell stack and not over its top.

Where the hood is manufactured as a pressed article, the draw angle can be used to define appropriate surface features in the hood to effect in-use control of fluid flow.

The at least one baffle is preferably designed so as to direct the gas flow close to the at least one fuel cell stack surface.

In order to further facilitate heat transfer from the external surface of the at least one fuel cell stack or component parts thereof, additional features can be provided, including for example protrusions such as fins, fingers or arms for example extending from the fuel cell stack layers (preferably including the at least one fuel cell), providing additional surface area across which heat exchange can take place and/or to encourage turbulence in gas flow close to the at least one fuel cell stack surface to improve heat transfer.

The clearance between the hood and the at least one fuel cell stack or component parts thereof or any protrusion therefrom or surface feature therein is preferably arranged so as to enhance gas flow and thus heat transfer across the feature.

Preferably, at least one formed shape is provided on the edge of at least one fuel cell stack layer in order to promote turbulence in gas flow.

Preferably, the internal surface of the hood is provided with a sulphur absorbing or adsorbing material to in-use remove sulphur from the oxidant prior to its entry into the at least one open-manifolded gas inlet. For example to entrap the residual sulphur for an automotive auxiliary power application the sulphur absorbing or adsorbing material can trap sulphur at levels associated with operating a fuel cell system in dirty city air.

Preferably, the internal surface of the hood is provided with a Cr adsorbing or absorbing material, for example in the form of a coating, to in-use remove any chromium species from the oxidant feed, thus reducing the possibility of Cr poisoning of the fuel cell cathode.

Preferably, the hood volume is at least partially filled with a thermally conductive mesh, network of fibres, or filler material which in-use enhances heat transfer between the at least one fuel cell stack and the gas. More preferably, such a material is electrically non-conductive. More preferably still, it is coated with at least one of a sulphur absorbing material, and a sulphur adsorbing material.

Preferably, to further improve the performance of the at least one fuel cell stack, the inlet fuel is also heated prior to its entering the at least one fuel cell stack. This is preferably achieved by passing the exhaust fuel flow along the internally manifolded fuel outlet to a gas-to-gas heat exchanger and an at least one condensing heat exchanger to remove water vapour and recover heat. The now drier exhaust fuel flow thus contains unreacted fuel gas, and the heat energy retained in the unused chemical energy is recovered by passing it to a burner where it mixes with the exhaust oxidant flow which has passed along the internally manifolded oxidant outlet and burns. This creates a high-temperature burner off-gas which is then preferably used to provide a heat source for heating the inlet fuel. In certain embodiments, this heat energy is used to support an endothermic steam reforming of the inlet fuel. The burner off-gas is then preferably passed to a steam generator unit to generate the steam required for the endothermic steam reforming before entering an optional start-up burner unit and then entering the pre-heater.

Where such multiple heat exchange steps are provided, it is particularly advantageous and desirable to thermally close-couple as may of them as possible. For example, providing the above heat exchange and chemical reaction units as at least one combined unit provides for a reduction in the size of the fuel cell stack system assembly. For example, a combined steam generator, fuel reformer and reformate cooler can be provided in one unit. Such a device or devices is preferably connected directly to the underside of the base plate opposite to the fuel cell stack side. Thus, gas path lengths are significantly reduced, and gas pipe connections are minimised, reducing part count and connection leakage risk and simplifying system assembly.

Preferably, the at least one fuel cell stack is a metal-supported intermediate temperature solid oxide fuel cell (IT-SOFC) stack, more preferably as taught in U.S. Pat. No. 6,794,075.

Preferably, the hood is manufactured from at least one layer of plastic, ceramic or metal or a mix of at least two of these materials, for example a plastic coated metal hood. More preferably, it is fabricated from stainless steel, for example formed by deep drawing, bending and welding, brazing, or casting. For low temperature fuel cell applications, the hood is preferably injection moulded from a suitable plastic material.

Preferably, the hood is thermally insulated on at least one of its inside and outside, more preferably on the outside. Appropriate insulating layers include but are not limited to those which are wound on or formed to match, or can be made from more than one layer and more than one insulating material. Preferably, for an intermediate- or high-temperature fuel cell system, a single layer of insulation is provided, comprising Promalight (RTM) (Promat UK Limited, Bracknell, UK; www.promat.co.uk).

Alternatively, a multi-layer insulation is provided comprising a first relatively bulky inner layer capable of withstanding the operational temperature (for example an insulation provided by Microtherm Inc. (TN, USA)) and a second thinner outer layer comprising an Aspen Aerogei (Aspen Aerogels, Inc., MA, USA) capable of withstanding the operational conditions external to the first or inner insulating layer(s).

Overall, these insulation options can provide a particular advantage of reducing the overall insulation volume whilst providing for insulation capable of withstanding temperatures outside of the operating temperature range of the outer layer insulation.

Certain system design embodiments allow for oxidant heating to occur using the pre-heater fed by hot gases from a tail gas burner and/or the fuel reforming process. However, the provision of heat from such sources involves a time lag and effective pre-heater operation is closely coupled to the overall operation of the fuel cell stack assembly.

It is desirable to include a controllable heating capability in order to reduce or decouple this closely coupled heat exchange relationship. Such a controllable heating capability may be achieved using an electrical heater.

It has been found that there are several disadvantages with locating an electrical heater external to the hood volume.

Where an electrical heating device is part of a pre-heater which is external to the hood volume (for example, a pre-heater comprising a heat exchanger), problems include: increased heat loss occurring from the conduit (commonly a pipe) between the pre-heater and the at least one fuel cell stack base plate, the requirement for additional features in the pre-heater to effectively direct oxidant flow over the electrical heating device (which adds complexity to the pre-heater design), an additional pre-heater manufacturing step (which might limit the temperatures available to braze a pre-heater during pre-heater manufacture or limit welding operations), adding complexity to the pre-heater design in order to account for the increased oxidant leak risk in running the electrical wiring from the electrical heating device out of the pre-heater unit, and the addition of a potentially high temperature heat source point in the pre-heater unit.

Placing the electrical heating device in an oxidant conduit between the pre-heater and the fuel cell stack hood is also problematic. Whilst the placement of the electrical heating device in the conduit will result in good thermal energy transfer to the oxidant, the conduit needs to be designed to accommodate the heater and also to allow the electrical connections to come out of the conduit in an effective way that does not create a leak path. Such a conduit design is likely to be considerably larger in packaging volume compared to the same conduit design without the requirement for the electrical heating device to be in place. This increase in packaging size can have a significant impact on the fuel cell stack assembly packaging and the manufacture assembly of the same. Additionally, increasing the conduit size to accommodate the electrical heating device increases the heat loss surface of the conduit, imposing additional design restrictions and potential operation efficiency penalties on such an approach.

Placing the electrical heating device within the general hood volume removes some or all of the above disadvantages. However, it is difficult to effectively direct oxidant flow onto such an electrical heating device, resulting in reduced heating effectiveness. Making the electrical heating device as part of the hood or mounting it on the hood increases heat loss from the hood surface.

The present invention further seeks to overcome these disadvantages.

Preferably, the fuel cell stack assembly additionally comprises an electrical heating device in or in direct thermal communication with the at least one gas inlet and contained within the hood volume or the hood or base plate, i.e. the electrical heating device is not located outside of the hood or base plate away from the hood volume.

It has been found that the provision of an electrical heating device in such a manner can be extremely advantageous. This is particularly the case where the pre-heater is a passive pre-heater.

Thus, the electrical heating device can be contained wholly within the gas inlet located up to and including the gas inlet point, or the electrical heating device can form a component part at the end of a gas inlet within the hood volume and define the at least one gas inlet point.

Preferably, control means for the electrical heating device are also provided. Control means for electrical heating devices are well known in the art, and will be readily apparent to one of ordinary skill.

Preferably, the apparatus is configured such that the electrical heating device provides heat energy to the fuel cell stack such that the fuel cell stack reaches a lower bound of its operating temperature range, preferably in the range of 400-450 degrees C., after the reformer reaches its operating temperature and produces reformate, more preferably immediately after the reformer reaches its operating temperature and produces reformate.

In certain embodiments, the at least one gas inlet enters the hood volume through the base plate, and in other embodiments the at least one gas inlet enters the hood volume through the hood.

In-use, the provision of an electrical heating device allows the provision of supplemental heating to the inlet oxidant stream when appropriate, for example:
  when performance of the pre-heater degrades;
  when the operating environment of the fuel cell stack system assembly is sub-optimal, e.g.
    when inlet oxidant temperature is too low (e.g. when cold ambient air is used as the oxidant), or
    where inlet oxidant is too wet (e.g. when humid ambient air is used as the oxidant);
  when the steam:carbon ratio is altered (for example when a fuel is used which would result in an increase in the steam:carbon ratio);
  when a rapid start-up or an increase in fuel cell stack temperature is required (for example in cases where the oxidant flowing to the gas inlet is at or would be at a temperature more than 100° C. below the in-use operating temperature at the inlet end of the fuel cell nearest the at least one open-manifolded gas inlet);
  when idling; or
  when there is no electrochemical activity occurring at the fuel cells (i.e. when the fuel cell stack assembly is switched "off" or "hibernating") to assist in rapid start-up.

By placing the electrical heating device in the at least one gas inlet as defined above, design placement and packaging constraints can be minimised. In particular:

The space occupied by the electrical heating device is within other component parts and thus already defined within the hood volume
  There can be good in-use thermal energy transfer form the electrical heating device to the oxidant
  The electrical heating device can have very low thermal inertia and can therefore be highly controllable and responsive when the is a demand for an increase or decrease in thermal energy output from the electrical heating device
  The wiring for the electrical heating device can be conveniently connected to a control circuit via the base plate, and this can be achieved using similar electrical connections to those used elsewhere in the fuel cell stack system assembly, for example electrical connections designed to transfer the fuel cell stack electrical power through the base plate.

Preferably, the electrical heating device comprises electrical heater wire, for example a wire made from a predominantly Ni/Cr or Ni/Cu metal or similar such materials. For example, the electrical heating device can comprise electrical heating wire wound around an inert, thermally stable mount, such as a mica board, or partly encased in an inert, thermally stable moulded device.

In situations where there is concern that the heating of the heater wire will produce Cr species evaporation from the wire and that such chromium species could then adversely affect the performance of the cathode material on the cathode side of the at least one fuel cell, the wire can be coated with a protective coating to reduce Cr species migration, or the electrical heating device can be designed so that the majority of the electrical heater wire is not directly exposed to the oxidant flow. For example, the wire can be separated from the in-use oxidant flow by a highly thermal energy conductive foil that has a low Cr content, for example a high melting temperature aluminium foil. In this case in-use the heat energy generated by the heater wire heat is transferred to the oxidant flow through the foil. To avoid the foil being melted by the electrical heating device, control means can be provided configured such that the electrical heating device only operates when there is sufficient oxidant flow past the foil to prevent it from melting.

In order to determine when and how much electrical heating from the electrical heating device is appropriate, sensor and/or input means can be provided as appropriate together with control means to effect the required heating. For example, as detailed below an at least one temperature sensor can be provided. Optionally, a humidity sensor for inlet oxidant, or a fuel type sensor can be provided. Optionally, input means for a user to indicate the type of fuel being used can be provided.

In certain embodiments, a temperature sensor is provided to in-use determine the temperature of oxidant flowing to or through the at least one gas inlet or the temperature at a chosen point within the hood volume. Preferably the temperature sensor is located (i) within the hood volume, or (ii) within the oxidant flow path between the pre-heater output and the open-manifold end of the at least one fuel cell stack, or (iii) along or inline with and in thermal communication with the oxidant flow path between the pre-heater output and the open-manifold end of the at least one fuel cell stack. Preferably, a temperature sensor is located in thermal communication with the oxidant flow path between the pre-heater and the base plate.

Preferably, the temperature sensor is in communication with control means which control the operation of the electrical heating device and the control means are configured to control the operation of the electrical heating device according to information determined from the temperature sensor. As noted above, operation of the electrical heating device may not be dependent solely upon information determined from the temperature sensor and thus other factors such as start-up, fuel type, oxidant type, oxidant temperature and oxidant humidity may be additionally used by the control means to determine operation of the electrical heating device.

Preferably, the electrical heating device has between 10 and 50% of the rated electrical capacity of the fuel cell stack assembly. For example, for a 1 kWe rated fuel cell stack capacity, the electrical heating device can have a capacity of 100 We, 200 We, 300 We, 400 We or 500 We.

The maximum thermal energy transferred from the electric heater to the oxide stream is set either physically by the specification of the electrical heater or by means of the control system. The highest thermal energy output from the electric heater is required during a rapid start-up. Under these conditions the thermal energy output of the electrical heater is controlled to ensure that as the whole system warms-up, the reformer becomes operational before the stack reaches the lower limit of its operating temperature range. Thus, during a rapid start-up reformate is fed to the anode side of the fuel cell stack before the fuel cell stack becomes chemically active. This allows some protection of the fuel cell chemical layers as they start to become chemically and electrochemically active.

The electrical heater is preferably controlled and programmed to keep the fuel cell stack oxidant inlet temperature above a certain required temperature, for example above 480 DegC. in the case of normal operation for an IT-SOFC fuel cell stack assembly.

The amount of thermal energy transferred from the electrical heating device to the inlet oxidant can be controlled with respect to the required fuel cell stack oxidant inlet temperature. Thus, monitoring the fuel cell stack oxidant inlet temperature allows the fuel cell stack system assembly (the fuel cell stack assembly including control means and electrical heating device) to control the amount of thermal energy added to the inlet oxidant by the electrical heating device in order to achieve the required fuel cell stack oxidant inlet temperature.

Methods of measuring the fuel cell stack oxidant inlet temperature include (but are not limited to):
  using a thermocouple placed directly in the fuel cell stack oxidant inlet region to measure the oxidant inlet temperature;
  using a thermocouple placed in the gas inlet device before an electrical heating device to measure the oxidant inlet temperature at this point, and then inferring the fuel cell stack oxidant inlet temperature by the addition of a temperature offset derived from a modeled and experimentally derived map or set of maps which is/are contained within control means. A map takes into account factors that can include the oxidant inlet temperature at the measure point, the oxidant mass flow rate at the measure point, the fuel cell stack power output, and the fuel cell stack exhaust outlet temperature; and/or
  using a thermocouple placed remote from the oxidant inlet where a map is built to account for the temperature effect factors between the measurement point and the fuel cell stack oxidant inlet point.

It is possible for a map or set of maps to be derived for differing fuel types or system arrangements, and for these maps to be loaded into the control means during system manufacture or during system operation or service. Map selection can be manually set during manufacture, during installation, by the operator or automatically achieved by the system.

Measurement of the factors is achieved by:
  oxidant inlet temperature at the measure point—from thermocouple;
  oxidant mass flow rate at the measure point—from the oxidant blower operating point;
  the fuel cell stack power output—from the power electronics operating point; and/or
  fuel cell stack exhaust outlet temperature—from a thermocouple measurement in the fuel cell stack exhaust outlet Measuring these factors allows the map to indicate the temperature increase of the fuel cell stack oxidant as it passes between the gas inlet prior to the electrical heater and the fuel cell stack oxidant inlet. If this temperature increase is less than the desired fuel cell stack oxidant inlet temperature, then additional thermal energy can be gained from the electric heating device with the electrical power being supplied to the electrical heating device being determined by the amount of thermal energy required and the oxidant mass flow rate.

Thus, for example, this can be achieved by using the following rules:
  T_in_inferred=T_measured+T_offset
  IF T_in_desired>T_in_inferred THEN add heat from electric heater
  T_in_desired=the desired oxidant temperature at the at least one open-manifolded gas inlet
  T_measured=the temperature determined by the temperature sensor
  T_offset=the temperature change resulting from oxidant flow in the hood volume from the at least one gas inlet point to the open manifold end of the at least one fuel cell stack.

T_in_desired can be selected according to the required system status. For example it can be ramped during system start-up, can be set to an optimal value for steady state operation, can be varied to achieve particular dynamic operating points or can be set below the T_measured for system shut down or for controlled system performance reduction—such as system idle or hibernation mode.

The amount of thermal energy required from the electrical heater is termed Q_in where:
Q_in=(T_in_desired−T_in_inferred)×(oxidant gas mass flow rate×oxidant gas specific heat capacity)

The present invention is equally applicable to fuel cell stack assemblies which use a variety of gas flow arrangements, including co-flow, counter-flow and cross-flow.

Also provided according to the present invention is a fuel cell stack system assembly comprising a fuel cell stack assembly according to the present invention.

Also provided according to the present invention is a method of operation of an intermediate-temperature solid oxide fuel cell stack assembly, said fuel cell stack assembly comprising:
  (i) a base plate;
  (ii) a hood sealingly attached to said base plate and defining a hood volume between said base plate and said hood;
  (iii) at least one intermediate-temperature solid oxide fuel cell stack mounted upon said base plate and enclosed by said hood;
  (iv) at least one gas inlet defining an at least one gas inlet point into said hood volume; and
  (v) a pre-heater located external to said hood volume and in fluid communication with an oxidant source and said at least one gas inlet and adapted to supply oxidant from said oxidant source to said hood volume via said gas inlet, each fuel cell stack comprising at least three fuel cell stack layers, each fuel cell stack layer comprising at least one intermediate-temperature solid oxide fuel cell, each fuel cell defining an oxidant inlet end and an exhaust oxidant outlet end said at least one fuel cell stack having:
- (a) at least one open-manifolded gas inlet defining an open-manifold end of said at least one fuel cell stack; and
- (b) at least one internally manifolded gas outlet, said at least one gas inlet point into said hood volume located remote from said open-manifold end of said at least one fuel cell stack,
wherein said at least one intermediate temperature solid oxide fuel cell stack defines a height X measured from the fuel cell stack layer closest to said base plate to the fuel cell stack layer furthest from said base plate, and wherein said at least on gas inlet point is located at a height Y above said fuel cell stack layer closest to said base plate, wherein $0.25X <= Y <= 0.75X$, said method comprising the steps of passing oxidant into said hood volume through said at least one gas inlet, passing it around the outside of said at least one fuel cell stack to said at least one open-manifolded gas inlet, direct heat transfer occurring between said oxidant and the external surface of said fuel cell stack layers prior to entry of said oxidant into said open-manifolded gas inlet, said pre-heater being configured such that in-use oxidant from said oxidant source is heated and supplied to said hood volume via said gas inlet at a temperature not greater than 100° C. below the in-use operating temperature at the inlet end of the fuel cell nearest the open-manifolded gas inlet (i.e. at a temperature 100° C. below or hotter than 100° C. below the in-use operating temperature at the inlet end of the fuel cell nearest the at least one open-manifolded gas inlet).

Preferably, said fuel cell stack assembly additionally comprises:
- (i) an electrical heating device in or in direct thermal communication with said at least one gas inlet and contained within said hood volume or said hood or base plate;
- (ii) an at least one temperature sensor located to in-use determine the temperature of oxidant flowing to said at least one open-manifolded gas inlet; and
- (iii) control means, said electrical heating device and said at least one temperature sensor being in electrical communication with said control means,
said method additionally comprising the step of effecting additional heating of said oxidant with said electrical heating device under the control of said control means such that in-use said oxidant at said at least one open-manifolded gas inlet is heated towards a desired temperature.

More preferably, the oxidant is heated to the desired temperature.

Preferably, the method additionally comprises the step of performing an electrochemical reaction with oxidant and fuel upon said at least one fuel cell to generate heat and electricity.

The invention will be further apparent from the following description with reference to the several figures of the accompanying drawings which show by way of example only forms of fuel cell stack assemblies. Of the figures.

Figure 10:
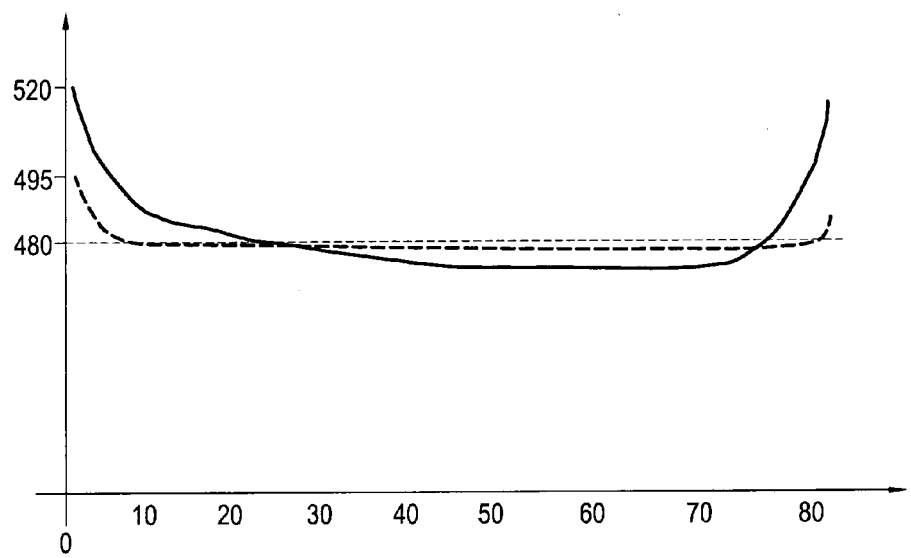
Figure 11:
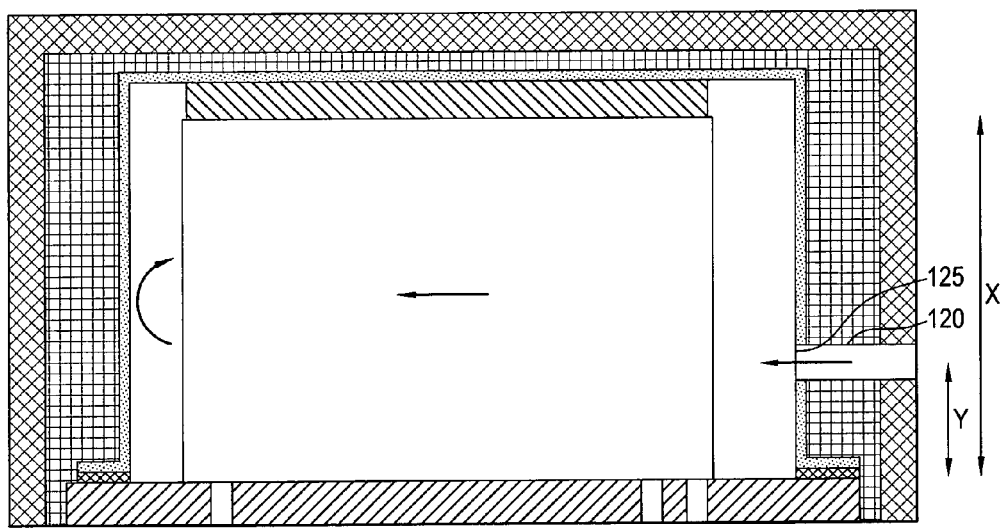
Figure 12:
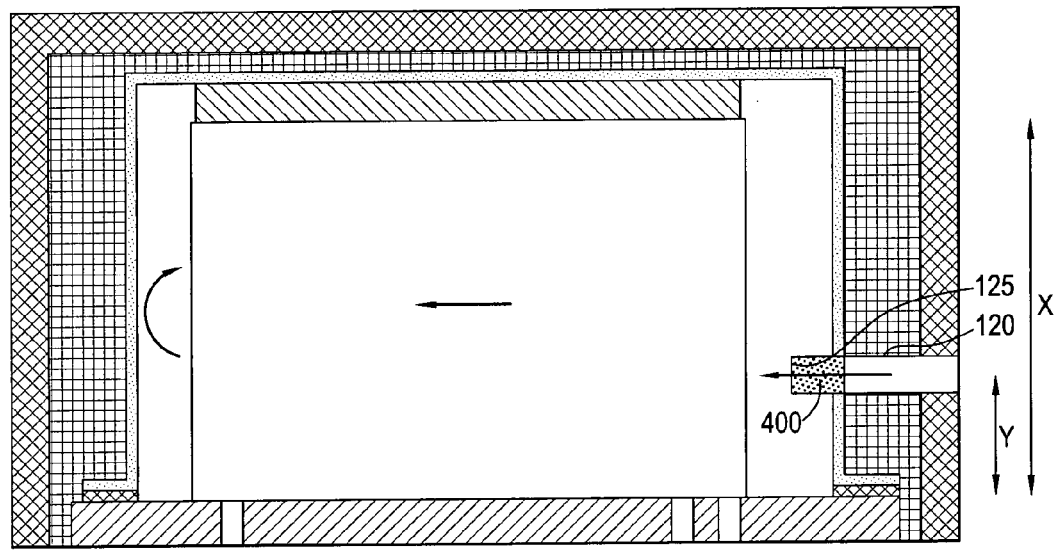
Figure 13:
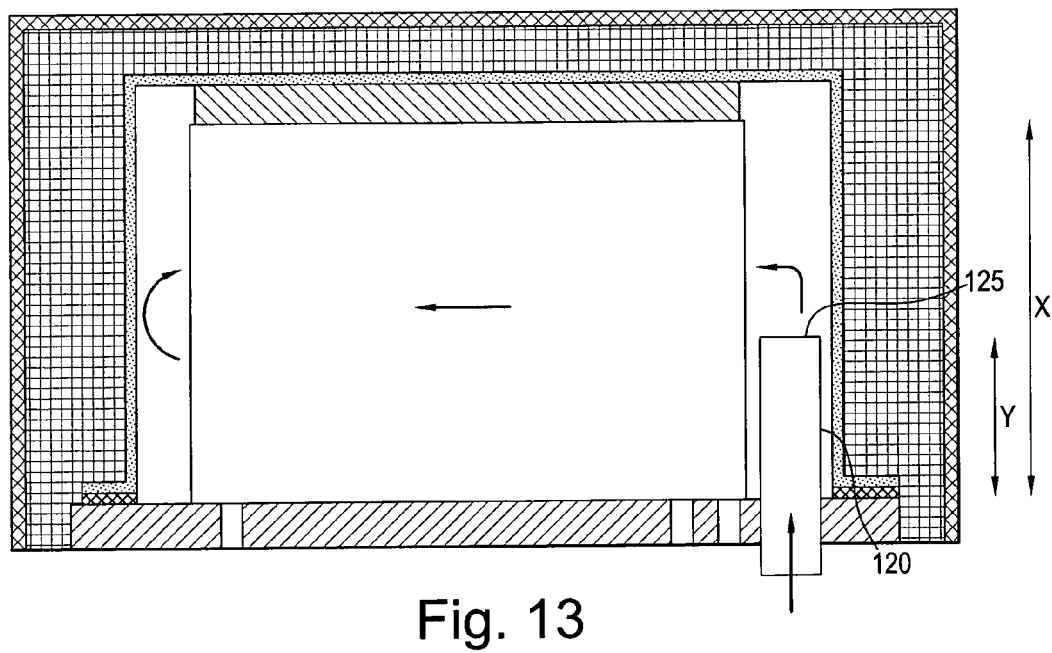
Figure 14:
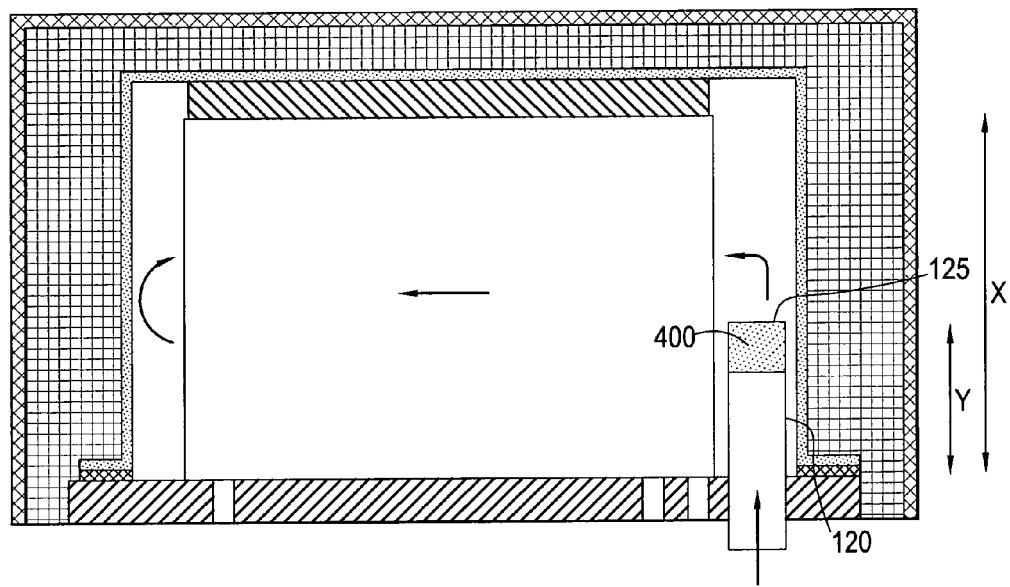

FIG. 10 shows the temperature difference between the air inlet point into the hood volume and the fuel cell stack layer air inlet temperature for the fuel cell stack layers in the fuel cell stack, for an ideal case (light dashed line at 480 Deg C.), a case where Y=0 (solid line, maximum Y-axis value of 520 Deg C.) and when Y=0.5X (heavy dashed line, maximum Y-axis value of 495 Deg C.). X-axis indicates the fuel cell stack layer number counted from the fuel cell stack layer closest to the base plate; Y-axis indicates oxidant temperature at the fuel cell stack layer open-manifolded gas inlet end;

FIGS. 11 shows a partial cut-away side view of a fuel cell stack assembly of the present invention with a gas inlet passing through the hood and defining a gas inlet point;

FIG. 12 shows the arrangement of FIG. 11, additionally comprising an electrical heater located in the gas inlet;

FIG. 13 shows a partial cut-away side view of a fuel cell stack assembly of the present invention with a gas inlet passing through the base plate and defining a gas inlet point; and FIG. 14 shows the arrangement of FIG. 13, additionally comprising an electrical heater located in the gas inlet Teachings of fuel cell and fuel cell stack assemblies are well known to one of ordinary skill in the art, and in particular include U.S. Pat. No. 6,794,075 , WO 02/35628 , WO 03/075382, WO 2004/089848 , WO 2005/078843 , WO 2006/079800 , WO 2006/106334 , WO 2007/085863 , WO 2007/110587 , WO 2008/001119 , WO 2008/003976 , WO 2008/015461 and WO 2008/053213 , which are incorporated herein by reference in their entirety.

A summary of reference signs used herein is given immediately prior to the claims.

In a first embodiment of a fuel cell stack assembly 1, a solid oxide fuel cell stack 10 is assembled from a number of fuel cell stack layers 20, with each fuel cell stack layer 20 containing one fuel cell 30 (in other embodiments, not shown, each fuel cell stack layer 20 contains a plurality of fuel cells 30). Each fuel cell comprises an anode 31, electrolyte 32 and cathode 33 mounted on a fuel cell metal substrate 34 and covering a fuel cell substrate porous region 36 which is surrounded by a fuel cell substrate non-porous region 35. Electrically conductive interconnect plate 37 provides manifolding for fuel flow. The metal substrate 34 of a first fuel cell stack layer 20 is prevented from coming into direct electrical contact with the interconnect plate 37 of a second adjacent fuel cell stack layer by electrically insulating gasket 38.

Fuel cell stack 10 is mounted on base plate 40 and a hood 50 is placed over fuel cell stack 10 and sealingly engages base plate 50 to define hood volume 60 between base plate 40 and hood 50 and containing within it fuel cell stack 10.

Fuel cell stack 10 is provided with an open-manifolded oxidant inlet 70, which defines open-manifold end 80 of fuel cell stack 10. Each fuel cell stack layer 20 also has an internally manifolded oxidant outlet 90 (for a fuel cell stack layer having a single fuel cell, corresponding to the exhaust oxidant outlet end of the fuel cell), together with an internally manifolded fuel inlet 100 and an internally manifolded fuel outlet 110, each of which pass through channels (not shown) in base plate 40.

Base plate 40 is additionally provided with oxidant inlet 120 into hood volume 60 and which defines an oxidant inlet point 125 located at the opposite end of fuel cell stack 10 to open-manifold end 80.

In use, fuel 130 feeds to the anode electrode side of fuel cell 30 via internally manifolded fuel inlet 100 which passes through base plate 40.

Oxidant (air) 140 enters hood volume 60 through oxidant inlet 120 at the opposite end of the fuel cell stack 10 to open-manifold end 80. A thermally insulating flow restriction device 150 is provided on top of fuel cell stack 10 end-plate 160 and is dimensioned so as to contact hood 50 and prevent airflow between end-plate 160 and hood 50. In-use, airflow thus occurs in hood volume 60 from oxidant inlet 120 along the sides of fuel cell stack 10 to open-manifold end 80, and into fuel cell stack 10. Arrows 210 indicate oxidant 140 flow.

In each of the present embodiments, oxidant inlet point 125 is located at a vertical height Y above the fuel cell stack layer 20 closest to base plate 40, and 0.25X<=Y<=0.75X, wherein X is a height measured from the fuel cell stack layer 20 closest to base plate 40 to the fuel cell stack layer 20 furthest from base plate 40.

Fuel cell stack end-plate 160 is a top end-plate, and base plate 40 acts as a bottom end-plate. Compression means are provided as appropriate to compress the at least one fuel cell stack, ensuring the necessary gas seal and electrical connections. Examples of suitable compression systems include those taught and referenced in WO 2007/085863.

External surfaces 170 of fuel cell stack 10 are provided with protrusions in the form of fins (not shown) which are shaped and dimensioned to enhance airflow over the sides of fuel cell stack 10 and to enhance heat transfer between the exterior of fuel cell stack 10 and oxidant 140.

Oxidant 140 enters hood volume 60 at an initial temperature of about 455° C. and the operational outlet temperature of fuel cell stack 10 at internally manifolded oxidant outlet 90 is about 600° C. The inlet end of the fuel cell 30 nearest open-manifolded oxidant inlet 70 is at a steady-state in-use operating temperature of about 500° C. In order to achieve an acceptable operational efficiency oxidant 140 is heated to a temperature of about 480° C. prior to entering open-manifolded oxidant inlet 70. Heating of oxidant 140 is effected by contact and heat exchange with fuel cell stack 10 external surface 170 and the interior surface 190 of hood 50.

In this embodiment, internally-manifolded oxidant inlet 70 comprises a discrete open manifold inlet for each fuel cell stack layer 20. In other embodiments (not shown), internally-manifolded oxidant inlet 70 comprises a plurality of open manifold inlets for each fuel cell stack layer. In still further embodiments (not shown), internally-manifolded oxidant inlet 70 comprises a single open manifold inlet for a plurality of fuel cell stack layers.

Oxidant 140 at a temperature of at least 480° C. enters open-manifolded oxidant inlet 70 and feeds to the cathode electrode side of fuel cell 30, and an electrochemical reaction takes place in which oxidant 140 reacts with the cathode and fuel 130 reacts with the anode, with the result that heat, water and electrical energy being generated. The electrical energy passes across a load on an electrical circuit (not shown).

The reacted fuel 130 then exits fuel cell 30 and fuel cell stack layer 20 via internally manifolded fuel outlet 110 at the side of fuel cell stack 10 remote to open-manifold end 80, passing through base plate 40. The reacted oxidant 140 then exits fuel cell 30 and fuel cell stack layer 20 via internally manifolded oxidant outlet 90 at the side of fuel cell stack 10 remote to open-manifold end 80, passing through base plate 40.

Thus, the side of the fuel cell stack 10 where the off-gases (oxidant 120 and fuel 130) exit the fuel cell stack 10 via internally manifolded fuel outlet 110 and internally manifolded oxidant outlet 90 will be at the highest temperature since it will be heated by the hot exhaust gases, and the open-manifold end 80 will be the coolest since it loses heat to the inlet oxidant 140 stream. Thus, the greatest thermal potential exists (and the greatest heat exchange will occur) between the external side of fuel cell stack 10 remote to open-manifold end 80 and oxidant 140 entering hood volume 60 at gas inlet point 125.

This heat exchange acts to benefit the fuel cell stack 10 since it acts to reduce the temperature gradient along the length of the fuel cell stack 10. This heat exchange also reduces the mechanical stress upon the fuel cell stack assembly 1 and allows the size and mass of pre-heater 200 to be reduced relative to what would be required if air were required to enter open-manifolded oxidant inlet 70 at a higher temperature.

Figure 5:
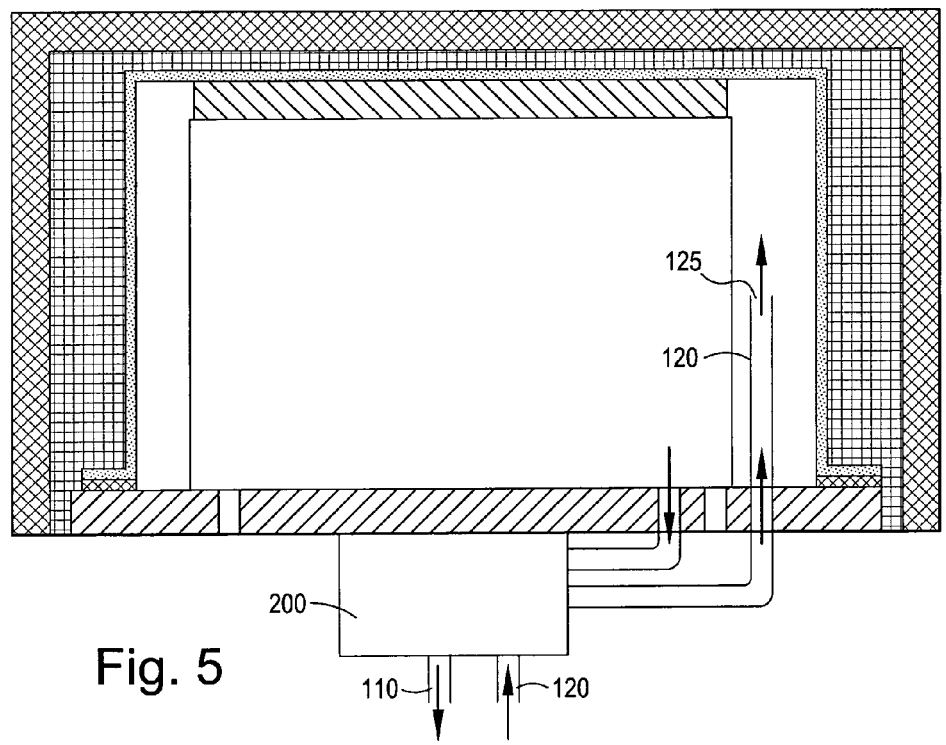
FIG. 5 is a partial cut-away side view of a further fuel cell stack assembly, additionally incorporating an oxidant heat exchange system (pre-heater)

As is shown in FIG. 5, fuel cell stack 10, base plate 40 and hood 50 form part of a larger fuel cell stack system assembly which includes an oxidant heat exchange system (pre-heater) 200 which raises oxidant 140 flowing through oxidant inlet 120 up to its initial inlet temperature of about 455° C. (in the instance when the fuel is methane-rich natural gas meeting requirements (UK Statutory Instrument 1996 No. 551 Gas Safety (Management) Regulations) and the steam:carbon ration is 2.5:1), with exhausted fuel 130 flowing along internally manifolded fuel outlet 110 acting as the heating fluid. Typical prior art fuel cell stack system assembly oxidant heat exchange system had to raise oxidant to a temperature of about 480° C. prior to its entry into the fuel cell stack 10, and this reduction in thermal load upon the oxidant pre-heater means that the size, mass, cost and complexity of the oxidant heat exchange system 200 can be substantially reduced.

In order to further improve the performance of the fuel cell stack 10, the inlet fuel 130 is also heated prior to its entering fuel cell stack 10. This is achieved by passing the exhaust fuel 130a flow along internally manifolded fuel outlet 110 to a gas-to-gas heat exchanger (290) and an at least one condensing heat exchanger 300 to remove water vapour and recover heat. The drier exhaust fuel 130b flow thus contains unreacted fuel gas 130, and the heat energy retained in the unused chemical energy is recovered by passing it to a burner (310) with exhaust oxidant 140a which has flowed along internally manifolded oxidant outlet 90. The high temperature burner off-gas 320 is then used to provide a heat source for heating the inlet fuel 130. In certain embodiments this heat energy is used to support an endothermic steam reforming in reformer unit 330 of the inlet fuel 130. The burner off-gas can then be passed to a steam generator unit 340 to generate steam 280 using water supply 270, which is required for the catalytic reforming before entering an optional start-up burner unit (not shown) and then entering oxidant heat exchange system 200.

In the present embodiment, a fuel cell stack end-plate 160 has mounted between it and the underside of hood 50 a thermally insulating flow restriction device 150 which blocks fluid flow across the top of end-plate 160 and which thermally insulates hood 50 from fuel cell stack 10.

In addition, a gas sealing thermally insulating vermiculite gasket 230 is provided between the base of hood 50 and base plate 40 to further thermally insulate hood 50 from fuel cell stack 10.

Further insulation is provided for components outside of hood 50 by a relatively thick inner insulating layer 240 of a Microtherm Freemoulding product and a relatively thin outer insulating layer 250 of Aspen Aerogel Pyrogel (RTM), which overall provide the desired thermal insulation of hood 50 whilst achieving such insulation with a reduced volume of insulating materials compared to that which would be required if the material of the inner insulating layer 240 alone were used.

In other embodiments (not shown) insulation layers 240, 250 are replaced with a single layer of Promalight (RTM) (Promat UK Limited, Bracknell, UK; www.promat.co.uk) insulation.

Figure 1:
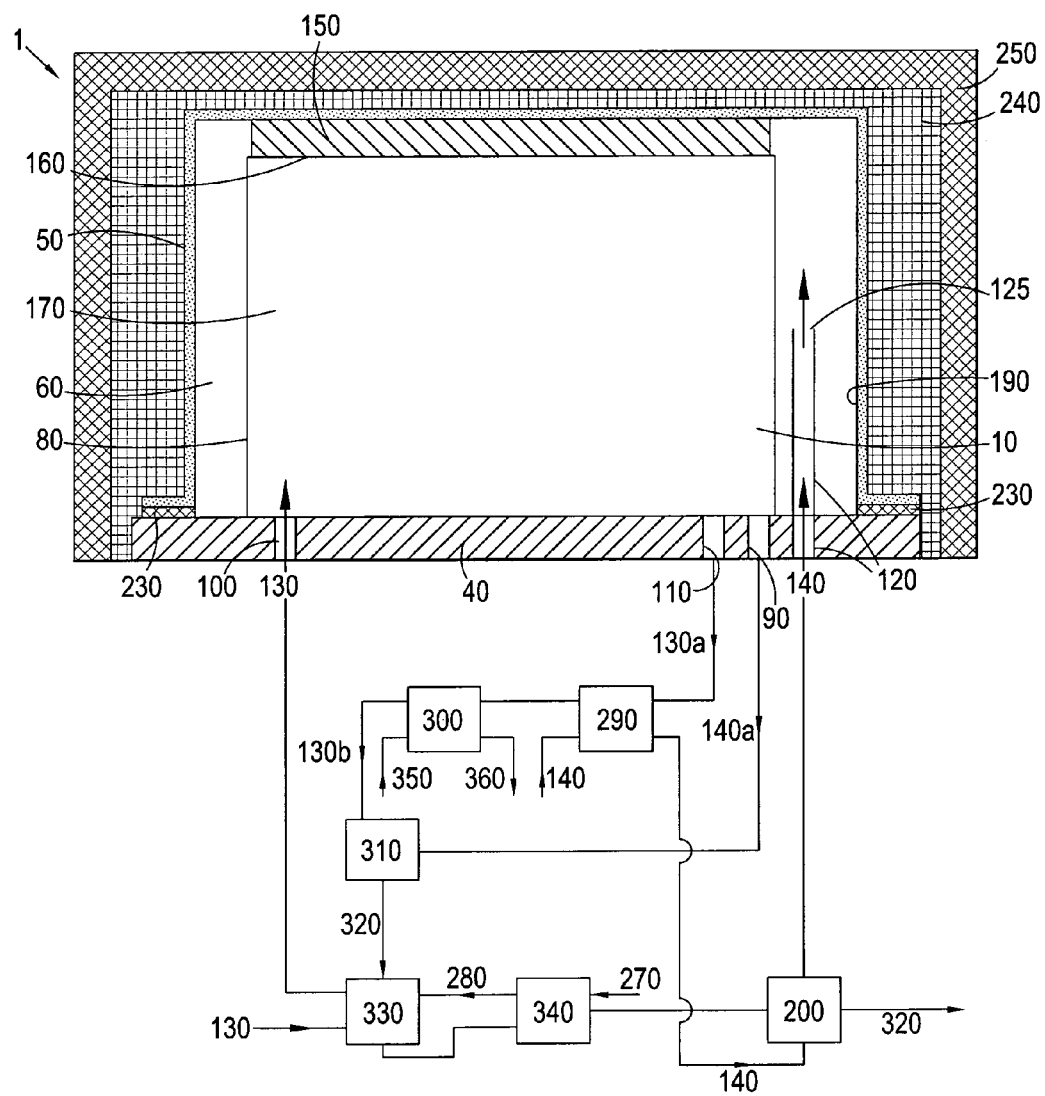
FIG. 1 shows a partial cut-away side view of a fuel cell stack assembly of the present invention.
Figure 2:
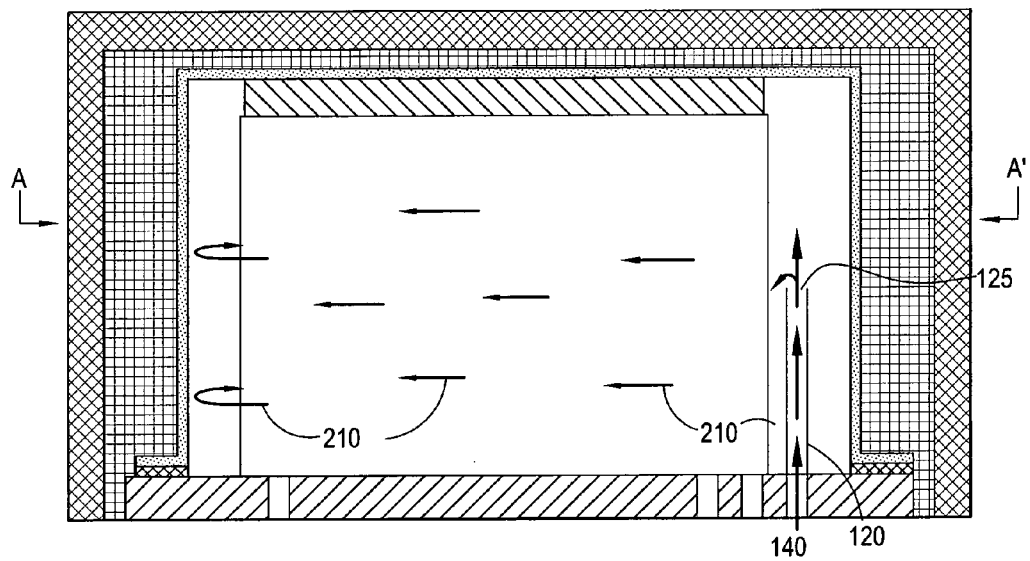
FIG. 2 shows oxidant fluid flow in the fuel cell stack assembly of FIG. 1.
Figure 3:
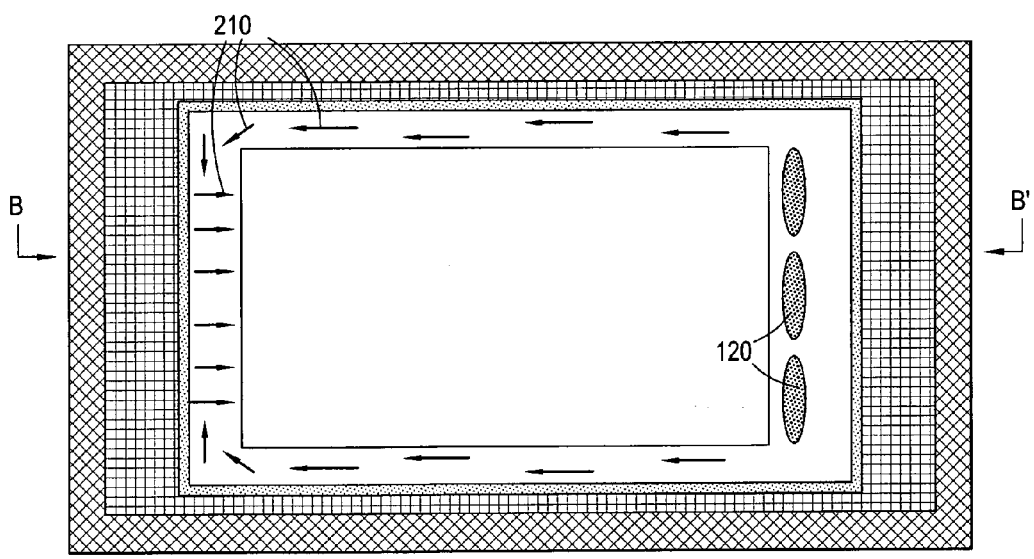
FIG. 3 is a section through lines A-A' showing oxidant fluid flow in the fuel cell stack assembly of FIG. 1.
Figure 4:
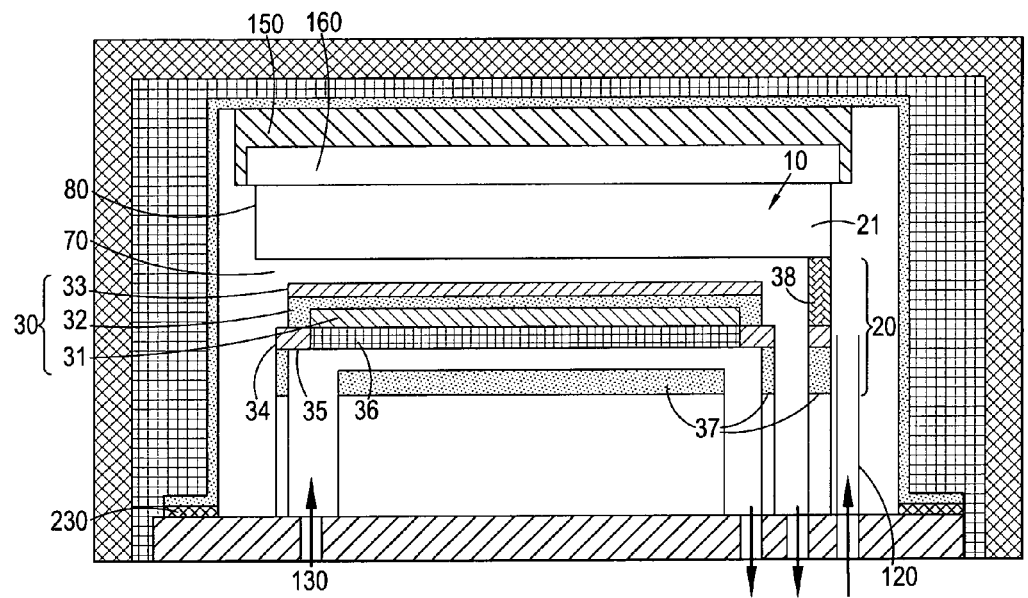
FIG. 4 is a schematic representation of a section through lines B-B' showing a single fuel cell stack layer.

FIG. 4 shows a section through B-B' (FIG. 3) with (for illustrative purposes only) an enlarged fuel cell stack layer 20 and additional fuel cell stack layers 21. As can be seen, air 140 enters the fuel cell stack assembly 1 through oxidant inlet 120 at oxidant inlet point 125, which is located at the opposite side of fuel cell stack 10 to (i.e. remote from) open-manifolded oxidant inlet 70. Air 140 then passes around the sides of fuel cell stack 10 (fluid flow over the top of fuel cell stack 10 being blocked by gas sealing thermally insulating vermiculite gasket 150 positioned between and contacting the top surface of fuel cell stack end-plate 160 and the hood 50) and is heated and passes to open-manifolded oxidant inlet 70 of fuel cell stack layer 20 and passes over the cathode 33 of intermediate temperature solid oxide fuel cell (IT-SOFC) 30, undergoes an electrochemical reaction to generate heat, oxides and electricity, and exhausts via manifolding 90. Fuel 130 enters fuel cell stack 10 via internally manifolded fuel inlet 100, passes under fuel cell substrate porous region 36 through which it passes to fuel cell anode 31 and undergoes an electrochemical reaction to generate heat, oxides (primarily carbon oxides and water) and electricity. Exhausted fuel 130 then exits fuel cell stack 10 via internally manifolded fuel outlet 110.

Each fuel cell stack layer 20 comprises an electrically conductive interconnect plate 37 which provides manifolding and for electrical contact with adjacent fuel cell stack 10 components. Fuel cell metal substrate 34 is mounted on top of interconnect plate 37 and comprises a fuel cell substrate porous region 36 bordered by fuel cell substrate non-porous region 35. Thus, fluid flow can occur through porous region 36. On top of porous region 36 is mounted fuel cell 30. Fuel cell anode covers porous region 36, and then fuel cell electrolyte 32 extends over anode 31 and porous region 36 to prevent fluid flow from the fuel side of fuel cell 30 to the oxidant side of fuel cell 30 through porous region 36. Fuel cell cathode 33 is mounted on top of fuel cell electrolyte 32.

An electrically conductive current conductor (not shown) extends from fuel cell cathode 33 and is in electrical contact with electrically conductive interconnect plate 37 so as to form an electrical circuit, and a load is placed upon the circuit. Additional fuel cell stack layers 21 are positioned on top of fuel cell stack layer 20, and electrical shorting from fuel cell metal substrate 34 to the electrically conductive interconnect plate 37 of an adjacent fuel cell stack layer 21 is prevented by electrically insulating gasket 38 which additionally provides mechanical support for additional fuel cell stack layers 21.

Figure 6:
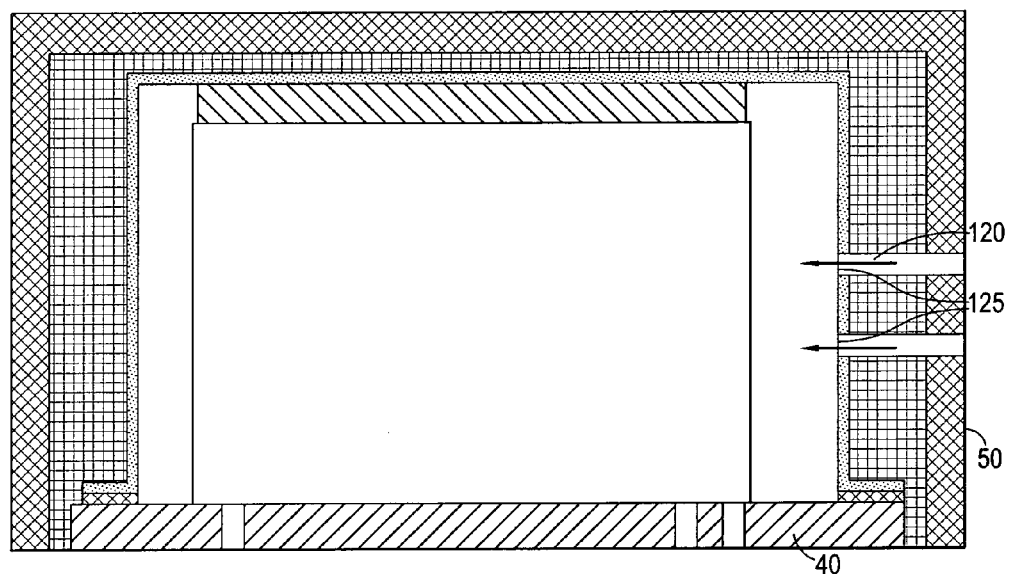
FIG. 6 shows an alternative fuel cell stack assembly with oxidant inlets located in the hood.

In a further embodiment (FIG. 6), a plurality of oxidant inlets 120 are provided in hood 50 rather than in base plate 40. This arrangement aids gas flow and distribution, particularly helping prevent stagnant areas of gas flow. Again, oxidant inlet points 125 are all located at a vertical height Y above the fuel cell stack layer 20 closest to base plate 40, and $0.25X<=Y<=0.75X$, wherein X is a height measured from the fuel cell stack layer 20 closest to base plate 40 to the fuel cell stack layer 20 furthest from base plate 40.

Figure 6A:
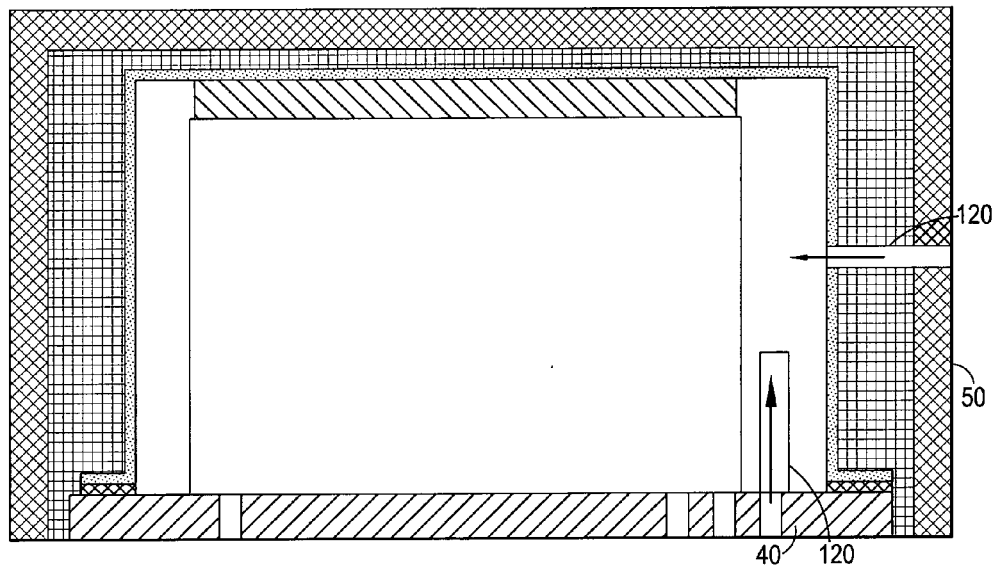
FIG. 6A shows an alternative fuel cell stack assembly with oxidant inlets located in the hood and the base plate.

In a further embodiment (FIG. 6A), a plurality of oxidant inlets 120 are provided in hood 50 as well as in base plate 40, and again this is done to aid gas flow and distribution, particularly helping prevent stagnant areas of gas flow.

Figure 6B:
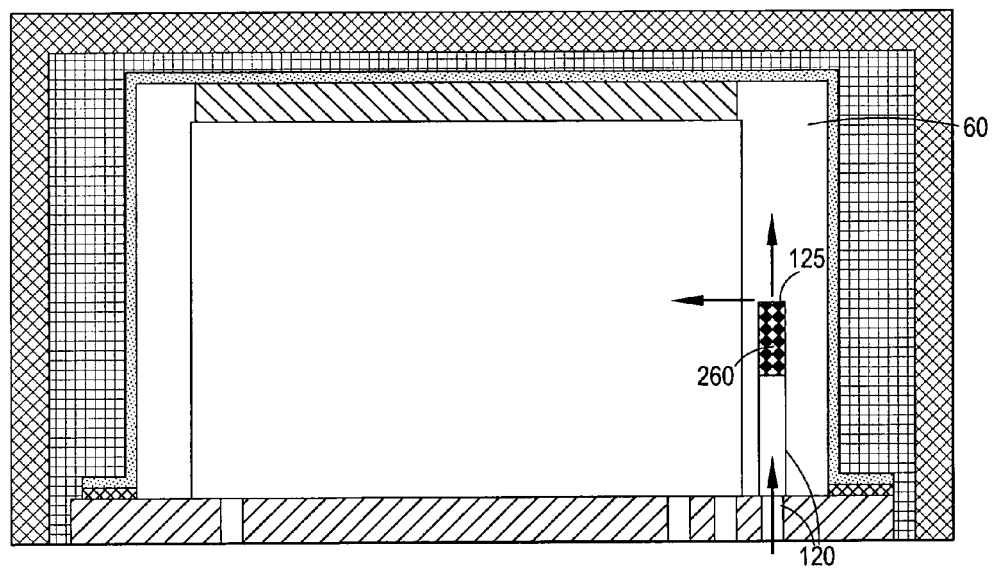
FIG. 6B shows an alternative fuel cell stack assembly with oxidant inlets located in the base plate and additionally comprising a flow distribution device.

In the embodiment of FIG. 6B, an oxidant inlet 120 is provided in base plate 40, and a flow distribution device 260 is provided comprising a perforated metal tube, designed to aid gas flow distribution from inlets 120 throughout hood volume 60. In alternative embodiments (not shown) hood distribution device 260 comprises a highly porous ceramic material, and a formed section of hood 50.

Figure 7:
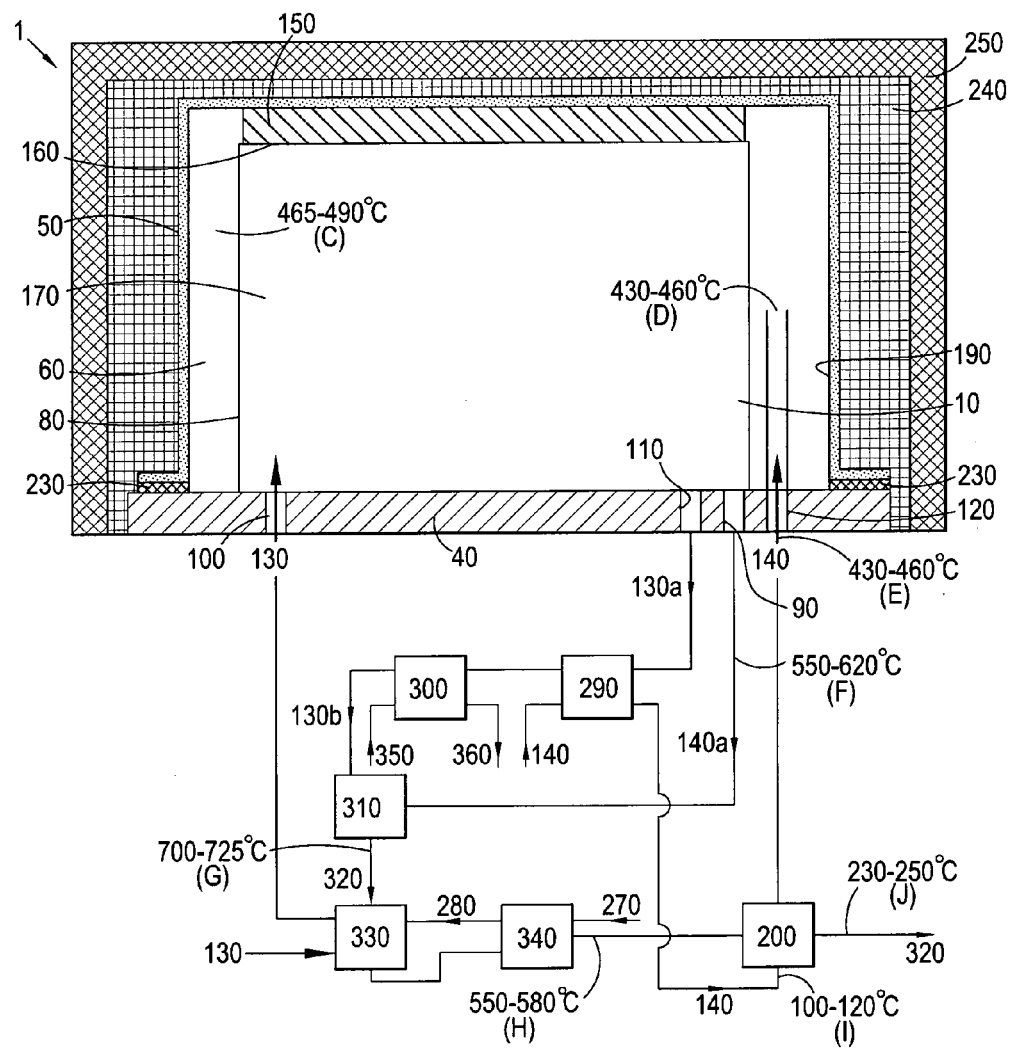
FIG. 7 shows the fuel cell stack system assembly of FIG. 1 indicating key fluid temperatures when operating on a methane-rich natural gas meeting requirements (UK Statutory Instrument 1996 No. 551 Gas Safety (Management) Regulations) with a steam to carbon ration in the steam reformer (330) of 2.5:1

In a further embodiment (FIG. 7), key fluid temperatures are shown when operating on methane-rich natural gas with a steam to carbon ration in the steam reformer (330) of 2.5:1.

Temperatures at positions C-J are as follows:

C—465-490° C.
D—430-460° C.
E—430-460° C.
F—550-620° C.
G—700-725° C.
H—550-580° C.
I—100-120° C.
J—230-250° C.

In another embodiment (FIG. 8), key fluid temperatures are shown temperatures when operating on propane-rich LPG with a steam to carbon ration in the steam reformer (330) of 3.5:1 . Notably, oxidant inlet 120 is additionally provided with electrical heater 400 to provide required additional heating, the inlet oxidant temperature at point (E) being lower than that for the embodiment of FIG. 7 and therefore requiring additional heating in order to achieve the desired operating efficiency and output of the fuel cell stack assembly 1.

Figure 8:
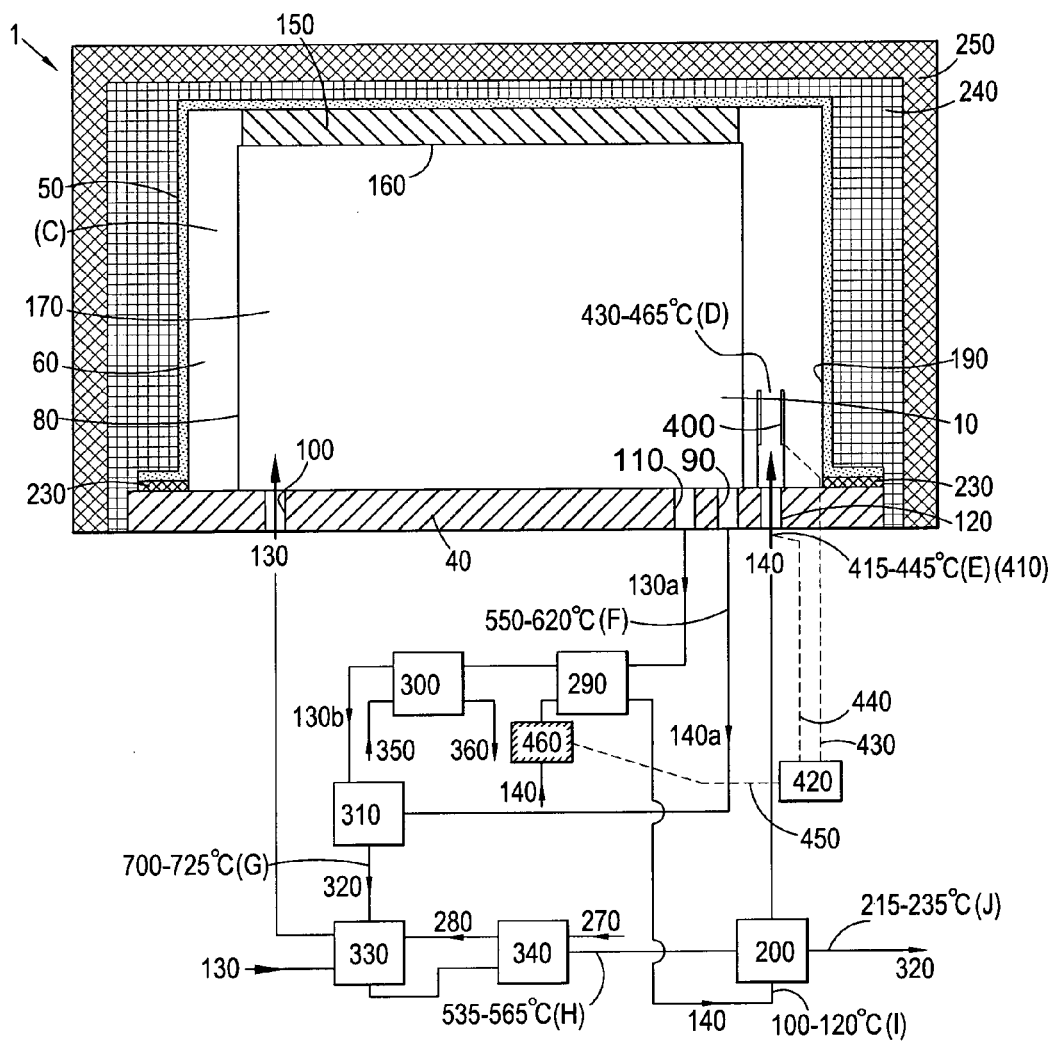
FIG. 8 shows the fuel cell stack system assembly of FIG. 1, indicating key fluid temperatures when operating on propane-rich LPG with a steam to carbon ration in the steam reformer (330) of 3.5:1

Control electronics 420, thermocouple 410, electrical heater 400, blower 460 and electrical connectors 430-450 are shown in FIG. 8. Control electronics 420, thermocouple 410, blower 460 and electrical connectors 440 and 450 are are also present (not shown) in the other embodiments.

In embodiments including electrical heater 400, control means 420 and electrical connector 430 are also present.

In-use, thermocouple 410 is electrically connected to control electronics 420 by electrical connector 440 and provides an electrical output which is converted by control electronics 410 into a temperature value. Blower 460 is electrically connected to control electronics 410 by electrical connector 450, and control electronics 410 is preconfigured with a blower oxidant mass flow map in order to estimate blower oxidant mass flow.

Additional inputs (not shown) provided to control electronics 410 are: the required electrical power output from the fuel cell stack assembly 1, and the measured electrical power output from the fuel cell stack assembly 1.

Control electronics 410 is preconfigured to use the input information to determine an appropriate electrical power supply level for electrical heater 400 and supplies the necessary electrical current to it by electrical connector 420.

Temperatures at positions C-J are as follows:
C—465-490° C.
D—430-465° C.
E—415-445° C.
F—550-620° C.
G—700-725° C.
H—535-565° C.
I—100-120° C.
J—215-235° C.

Figure 9:
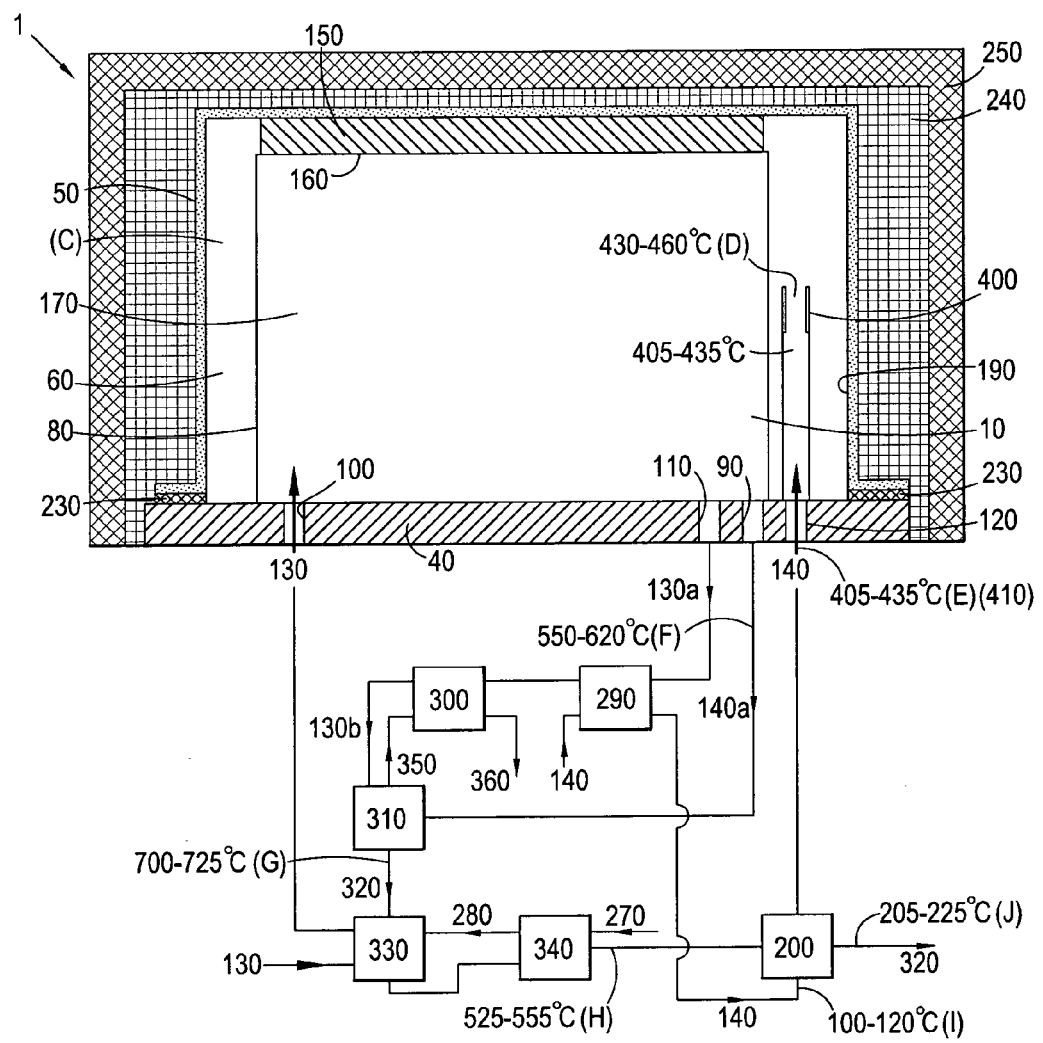
FIG. 9 shows the fuel cell stack system assembly of FIG. 1, indicating key fluid temperatures when operating on butane-rich LPG with a steam to carbon ration in the steam reformer (330) of 4.0:1

In a further embodiment (FIG. 9), key fluid temperatures are indicated when operating on butane-rich LPG with a steam to carbon ration in the steam reformer (330) of 4.0:1. Again, this requires additional heating which is provided by electrical heater 400.

Temperatures at positions C-J are as follows:
C—465-490° C.
D—430-460° C.
E—405-435° C.
F—550-620° C.
G—700-725° C.
H—525-555° C.
I—100-120° C.
J—205-225° C.

FIG. 10 shows the results of modeling of oxidant temperature at the open-manifolded gas inlet ends of fuel cell stack layers, and which results have been validated with experimental data. In a case where Y=0 there is a significant variation from the optimal temperature, and when Y=0.5X there is a significantly improvement. This results in enhanced fuel cell stack assembly operation and efficiency.

FIGS. 11-13 show alternate arrangements of oxidant inlet 120 and oxidant inlet point 125 and also the provision of electrical heaters 400 in certain embodiments.

It will be appreciated that it is not intended to limit the present invention to the above embodiments only, many other embodiments being readily apparent to a person of ordinary skill in the art without departing from the scope of the appended claims.

REFERENCE SIGNS

1—fuel cell stack assembly
10—solid oxide fuel cell stack
20—fuel cell stack layer
21—additional fuel cell stack layers
30—fuel cell
31—fuel cell anode
32—fuel cell electrolyte
33—fuel cell cathode
34—fuel cell metal substrate
35—fuel cell substrate non-porous region
36—fuel cell substrate porous region
37—electrically conductive interconnect plate
38—electrically insulating gasket
40—base plate
50—hood
60—hood volume
70—open-manifolded oxidant inlet
80—open-manifold end
90—internally manifolded oxidant outlet
100—internally manifolded fuel inlet
110—internally manifolded fuel outlet
120—oxidant inlet
125—gas inlet point
130—fuel
130*a* —exhaust fuel
130*b* —drier exhaust fuel
140—oxidant (air)
140*a* —exhaust oxidant
150—thermally insulating block
160—fuel cell stack end-plate
170—fuel cell stack external surface
190—hood interior surface
200—oxidant heat exchange system (pre-heater)
210—oxidant 140 flow
230—gas sealing thermally insulating vermiculite gasket
240—inner insulating layer
250—outer insulating layer
260—flow distribution device
270—water
280—steam
290—gas to gas heat exchanger
300—condensing heat exchanger
310—tail gas burner
320—burner off-gas
330—steam reformer
340—steam generator
350—cooling fluid in
360—cooling fluid out
400—electrical heater
410—thermocouple
420—control electronics
430—electrical connector
440—electrical connector
450—electrical connector
460—blower

The invention claimed is:

1. An intermediate-temperature solid oxide fuel cell stack assembly comprising:
(i) a base plate;
(ii) a hood sealingly attached to said base plate and defining a hood volume between said base plate and said hood;
(iii) at least one intermediate-temperature solid oxide fuel cell stack mounted upon said base plate and enclosed by said hood;
(iv) at least one gas inlet defining an at least one gas inlet point into said hood volume; and
(v) a pre-heater located external to said hood volume and in fluid communication with an oxidant source and said at least one gas inlet and adapted to supply oxidant from said oxidant source to said hood volume via said gas inlet,
each fuel cell stack comprising at least three fuel cell stack layers, each fuel cell stack layer comprising at least one intermediate-temperature solid oxide fuel cell, each fuel cell defining an oxidant inlet end and an exhaust oxidant outlet end,
said at least one fuel cell stack having:
(a) at least one open-manifolded gas inlet defining an open-manifold end of said at least one fuel cell stack; and
(b) at least one internally manifolded gas outlet,
said at least one gas inlet point into said hood volume located remote from said open-manifold end of said at least one fuel cell stack such that in-use oxidant enters said hood volume through said at least one gas inlet and passes around the outside of said at least one fuel cell stack to said at least one open-manifolded gas inlet, direct heat transfer occurring between said oxidant and the external surface of said fuel cell stack layers prior to entry of said oxidant into said open manifolded gas inlet, said pre-heater being configured such that in-use oxidant from said oxidant source is heated and supplied to said hood volume via said at least one gas inlet at a temperature not more than 100° C. below in-use operating temperature at the inlet end of the fuel cell nearest the at least one open-manifolded gas inlet, wherein said at least one intermediate temperature solid oxide fuel cell stack defines a height X measured from the fuel cell stack layer closest to said base plate to the fuel cell stack layer furthest from said base plate, and wherein each said at least one gas inlet point is located at a height Y above said fuel cell stack layer closest to said base plate, wherein $0.25X<=Y<=0.75X$.

2. A fuel cell stack assembly according to claim 1, not comprising an inlet gas pre-heater located as part of said hood.

3. A fuel cell stack assembly according to claim 1, wherein said at least one intermediate-temperature solid oxide fuel cell stack is a metal-supported intermediate-temperature solid oxide fuel cell stack.

4. A fuel cell stack assembly according to claim 1, said at least one fuel cell stack additionally comprising at least one internally manifolded fuel inlet.

5. A fuel cell stack assembly according to claim 4, said at least one internally manifolded gas outlet being an internally manifolded exhaust fuel outlet, said fuel cell stack additionally comprising at least one internally manifolded exhaust oxidant outlet.

6. A fuel cell stack assembly according to claim 4, said at least one internally manifolded gas outlet comprising at least one internally manifolded mixed exhaust fuel and oxidant outlet.

7. A fuel cell stack assembly according to claim 1, the external surface of said at least one fuel cell stack layer additionally comprising at least one protrusion adapted to in-use effect heat transfer between it and the gas.

8. A fuel cell stack assembly according to claim 1, at least one of the internal surface of said hood and the external surface of said at least one fuel cell stack layer additionally comprising at least one protrusion adapted to in-use cause turbulent fluid flow.

9. A fuel cell stack assembly according to claim 1, wherein said fuel cell stack has an in-use operating temperature of 450-650° C.

10. A fuel cell stack assembly according to claim 1, wherein said at least one intermediate-temperature solid oxide fuel cell stack is metal-supported.

11. A fuel cell stack according to claim 1, additionally comprising an electrical heating device in or in direct thermal communication with said at least one gas inlet and contained within said hood volume or said hood or base plate.

12. A fuel cell stack assembly according to claim 11, additionally comprising control means for said electrical heating device.

13. A fuel cell stack assembly according to claim 12, additionally comprising a temperature sensor for in-use determining the temperature of oxidant flowing to or through said at least one gas inlet or the temperature of oxidant at a chosen point within said hood volume.

14. A fuel cell stack system assembly comprising a fuel cell stack assembly according to claim 1.

15. A method of operation of an intermediate-temperature solid oxide fuel cell stack assembly, said fuel cell stack assembly comprising:
(i) a base plate;
(ii) a hood sealingly attached to said base plate and defining a hood volume between said base plate and said hood;
(iii) at least one intermediate-temperature solid oxide fuel cell stack mounted upon said base plate and enclosed by said hood;
(iv) at least one gas inlet defining an at least one gas inlet point into said hood volume; and
(v) a pre-heater located external to said hood volume and in fluid communication with an oxidant source and said at least one gas inlet and adapted to supply oxidant from said oxidant source to said hood volume via said gas inlet, each fuel cell stack comprising at least three fuel cell stack layers, each fuel cell stack layer comprising at least one intermediate-temperature solid oxide fuel cell, each fuel cell defining an oxidant inlet end and an exhaust oxidant outlet end said at least one fuel cell stack having:
(a) at least one open-manifolded gas inlet defining an open-manifold end of said at least one fuel cell stack; and
(b) at least one internally manifolded gas outlet, said at least one gas inlet point into said hood volume located remote from said open-manifold end of said at least one fuel cell stack, wherein said at least one intermediate temperature solid oxide fuel cell stack defines a height X measured from the fuel cell stack layer closest to said base plate to the fuel cell stack layer furthest from said base plate, and wherein each said at least on gas inlet point is located at a height Y above said fuel cell stack layer closest to said base plate, wherein $0.25X<=Y<=0.75X$, said method comprising the steps of passing oxidant into said hood volume through said at least one gas inlet, passing it around the outside of said at least one fuel cell stack to said at least one open-manifolded gas inlet, direct heat transfer occurring between said oxidant and the external surface of said fuel cell stack layers prior to entry of said oxidant into said open-manifolded gas inlet, said pre-heater being configured such that in-use oxidant from said oxidant source is heated and supplied to said hood volume via said gas inlet at a temperature not greater than 100° C. below in-use operating temperature at the inlet end of the fuel cell nearest the open-manifolded gas inlet.

16. A method according to claim 15, additionally comprising the step of performing an electrochemical reaction with oxidant and fuel upon said at least one intermediate-temperature solid oxide fuel cell to generate heat and electricity.

17. A method according to claim 15, said fuel cell stack assembly additionally comprising:
(i) an electrical heating device in or in direct thermal communication with said at least one gas inlet and contained within said hood volume or said hood or base plate;
(ii) an at least one temperature sensor located to in-use determine the temperature of oxidant flowing to said at least one open-manifolded gas inlet; and
(iii) control means, said electrical heating device and said at least one temperature sensor being in electrical communication with said control means, said method additionally comprising the step of effecting additional heating of said oxidant with said electrical heating device under the control of said control means such that in use said oxidant at said at least one open-manifolded gas inlet is heated towards a desired temperature.

* * * * *